(12) United States Patent
Hu et al.

(10) Patent No.: US 12,212,853 B2
(45) Date of Patent: *Jan. 28, 2025

(54) ULTRA-WIDE FIELD-OF-VIEW FLAT OPTICS

(71) Applicant: Massachusetts Institute of Technology, Cambridge, MA (US)

(72) Inventors: Juejun Hu, Newton, MA (US); Tian Gu, Fairfax, VA (US); Mikhail Shalaginov, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 468 days.

This patent is subject to a terminal disclaimer.

(21) Appl. No.: 17/209,496

(22) Filed: Mar. 23, 2021

(65) Prior Publication Data

US 2021/0306564 A1    Sep. 30, 2021

Related U.S. Application Data

(63) Continuation of application No. 16/894,945, filed on Jun. 8, 2020, now Pat. No. 10,979,635.

(Continued)

(51) Int. Cl.
*H04N 23/698* (2023.01)
*G02B 1/00* (2006.01)
*G02B 13/06* (2006.01)

(52) U.S. Cl.
CPC .......... *H04N 23/698* (2023.01); *G02B 1/002* (2013.01); *G02B 13/06* (2013.01)

(58) Field of Classification Search
CPC ..... H04N 5/23238; G02B 1/002; G02B 13/06
(Continued)

(56) References Cited

U.S. PATENT DOCUMENTS 3,085,469 A    4/1963   Carlson
4,061,423 A   12/1977   Pomerantzeff
(Continued)

FOREIGN PATENT DOCUMENTS

CN    201853211 U    6/2011
CN    102449584 A    5/2012
(Continued)

OTHER PUBLICATIONS

A Comprehensive List of 3D Sensors Commonly Leveraged in ROS Development. ROS-Industrial. Accessed at https://rosindustrial.org/3d-camera-survey on Sep. 12, 2019, 11 pages.
(Continued)

*Primary Examiner* — William Choi
(74) *Attorney, Agent, or Firm* — Smith Baluch LLP

(57) ABSTRACT

Wide-angle optical functionality is beneficial for imaging and image projection devices. Conventionally, wide-angle operation is attained by a complicated assembly of optical elements. Recent advances have led to meta-surface lenses or meta-lenses, which are ultra-thin planar lenses with nanoantennas that control the phase, amplitude, and/or polarization of light. Here, we present a meta-lens capable of diffraction-limited focusing and imaging over an unprecedented >170° angular field of view (FOV). The lens is integrated on a one-piece flat substrate and includes an aperture on one side and a single meta-surface on the other side. The meta-surface corrects third-order Seidel aberrations, including coma, astigmatism, and field curvature. The meta-lens has a planar focal plane, which enables considerably simplified system architectures for imaging and projection. The meta-lens design is generic and can be readily adapted to different meta-atom geometries and wavelength ranges to meet diverse application demands.

27 Claims, 13 Drawing Sheets

Related U.S. Application Data

(60) Provisional application No. 62/897,452, filed on Sep. 9, 2019, provisional application No. 62/884,645, filed on Aug. 8, 2019.

(58) Field of Classification Search
USPC .................................. 359/738, 739; 348/335
See application file for complete search history.

(56) References Cited

U.S. PATENT DOCUMENTS

| | | | | |
|---|---|---|---|---|
| 5,537,247 | A | * | 7/1996 | Xiao .................. G02B 21/0032 250/201.3 |
| 9,295,388 | B2 | | 3/2016 | Lawson et al. |
| 10,408,416 | B2 | | 9/2019 | Khorasaninejad et al. |
| 10,408,419 | B2 | | 9/2019 | Aleta et al. |
| 10,591,643 | B2 | | 3/2020 | Lin et al. |
| 10,591,746 | B2 | | 3/2020 | Macinnis |
| 10,795,168 | B2 | | 10/2020 | Riley, Jr. et al. |
| 10,979,635 | B2 | * | 4/2021 | Hu ...................... G02B 27/0172 |
| 11,206,978 | B2 | | 12/2021 | Hu et al. |
| 2007/0152966 | A1 | | 7/2007 | Krah et al. |
| 2017/0082263 | A1 | | 3/2017 | Byrnes et al. |
| 2017/0307857 | A1 | | 10/2017 | Ning et al. |
| 2019/0049632 | A1 | | 2/2019 | Shin et al. |
| 2019/0064532 | A1 | | 2/2019 | Riley, Jr. et al. |
| 2019/0113775 | A1 | | 4/2019 | Jang et al. |
| 2019/0196068 | A1 | | 6/2019 | Tsai et al. |
| 2020/0081294 | A1 | | 3/2020 | You et al. |
| 2020/0271941 | A1 | | 8/2020 | Riley, Jr. et al. |
| 2021/0028215 | A1 | * | 1/2021 | Devlin ............... G02B 27/4244 |
| 2021/0263329 | A1 | | 8/2021 | Latawiec |
| 2022/0052093 | A1 | | 2/2022 | Devlin et al. |
| 2022/0110522 | A1 | | 4/2022 | Hu et al. |

FOREIGN PATENT DOCUMENTS

| | | | |
|---|---|---|---|
| CN | 106527093 | A | 3/2017 |
| CN | 107037713 | A | 8/2017 |
| CN | 107209607 | A | 9/2017 |
| CN | 107884066 | A | 4/2018 |
| CN | 108291983 | A | 7/2018 |
| CN | 208569202 | U | 3/2019 |
| CN | 109709784 | A | 5/2019 |
| CN | 109814195 | A | 5/2019 |
| JP | 2012032984 | A | 2/2012 |
| WO | 2013032758 | A1 | 3/2013 |
| WO | 2018204856 | A1 | 11/2018 |
| WO | 2018218063 | A1 | 11/2018 |
| WO | 2019006076 | A1 | 1/2019 |
| WO | 2019046827 | A1 | 3/2019 |

OTHER PUBLICATIONS

Aieta et al., "Aberration-free ultrathin flat lenses and axicons at telecom wavelengths based on plasmonic metasurfaces." Nano letters 12.9 (2012): 4932-4936.
Aieta et al., "Aberrations of flat lenses and aplanatic metasurfaces." Optics express 21.25 (2013): 31530-31539.
Alu et al., Honorary issue for Federico Capasso on "Metamaterials & Metasurfaces". Nanophotonics 7, (2018). 311 pages.
An et al., "A Novel Modeling Approach for All-Dielectric Metasurfaces Using Deep Neural Networks." arXiv preprint arXiv:1906.03387 (2019). 18 pages.
An et al., "Generative Multi-Functional Meta-Atom and Metasurface Design Networks." arXiv preprint arXiv:1908.04851 (2019).
Arbabi et al., "Miniature optical planar camera based on a wide-angle metasurface doublet corrected for monochromatic aberrations." Nature communications 7.1 (2016): 1-9.
Arbabi et al., "Multiwavelength metasurfaces through spatial multiplexing." Scientific reports 6 (2016): 32803. 8 pages.
Capasso, "The future and promise of flat optics: a personal perspective." Nanophotonics 7.6 (2018): 953-957.
Chen et al., "A broadband achromatic metalens for focusing and imaging in the visible." Nature nanotechnology13.3 (2018): 220-226.
Dehoog et al., "Fundus camera systems: a comparative analysis." Applied optics 48.2 (2009): 221-228.
Du et al., "Stencil lithography for scalable micro-and nanomanufacturing." Micromachines 8.4 (2017): 131.
Engelberg et al., "Near-IR wide-field-of-view Huygens metalens for outdoor imaging applications." Nanophotonics 9.2 (2020): 361-370.
Eye Tracking Market worth $1,786 million by 2025. Markets and Markets. Accessed at https://www.marketsandmarkets.com/PressReleases/eye-tracking.asp on Sep. 11, 2020. 5 pages.
Fierson et al., "Telemedicine for evaluation of retinopathy of prematurity." Pediatrics 135.1 (2015): e238-e254. 19 pages.
Genevet et al., "Recent advances in planar optics: from plasmonic to dielectric metasurfaces." Optica 4.1 (2017): 139-152.
Gissibl et al., "Two-photon direct laser writing of ultracompact multi-lens objectives." Nature Photonics 10.8 (2016): 554-560.
Groever et al., "Meta-lens doublet in the visible region." Nano letters 17.8 (2017): 4902-4907.
Grunnet-Jepsen et al., "Best-Known-Methods for Tuning Intel® RealSense™ D400 Depth Cameras for Best Performance." Intel Corporation: Satan Clara, CA, USA 1 (2018). 10 pages.
Heaney, HoloLens 2's Field of View Revealed. UploadVR Feb. 25, 2019. Accessed at https://uploadvr.com/hololens-2-field-of-view/ on Aug. 20, 2019, 10 pages.
Hu et al., "Demonstration of a-Si metalenses on a 12-inch glass wafer by CMOS-compatible technology." arXiv preprint arXiv:1906.11764 (2019). 6 pages.
International Search Report and Written Opinion in International Patent Application No. PCT/US2020/036557 mailed Sep. 3, 2020, 15 pages.
JDC Micro LED Start Kit. Jasper Display Corp. Accessed at https://www.jasperdisplay.com/products/micro-led-start-kit/ on Aug. 20, 2019, 3 pages.
Kamali et al., "A review of dielectric optical metasurfaces for wavefront control." Nanophotonics 7.6 (2018): 1041-1068.
Kamali et al., "Decoupling optical function and geometrical form using conformal flexible dielectric metasurfaces." Nature communications 7.1 (2016): 1-7.
Kar et al., "A review and analysis of eye-gaze estimation systems, algorithms and performance evaluation methods in consumer platforms." IEEE Access 5 (2017): 16495-16519.
Kerker et al., "Electromagnetic scattering by magnetic spheres." JOSA 73.6 (1983): 765-767.
Khorasaninejad et al., "Metalenses at visible wavelengths: Diffraction-limited focusing and subwavelength resolution imaging." Science 352.6290 (2016): 1190-1194.
Khorasaninejad et al., "Metalenses: Versatile multifunctional photonic components." Science 358.6367 (2017): eaam8100. 10 pages.
Kress et al., "A review of head-mounted displays (HMD) technologies and applications for consumer electronics." Photonic Applications for Aerospace, Commercial, and Harsh Environments IV. Vol. 8720. International Society for Optics and Photonics, May 31, 2013. 14 pages.
Kuznetsov et al., "Optically resonant dielectric nanostructures." Science 354.6314 (2016): aag2472. 10 pages.
Lalanne et al., "Blazed binary subwavelength gratings with efficiencies larger than those of conventional échelette gratings." Optics letters 23.14 (1998): 1081-1083.
Lalanne et al., "Metalenses at visible wavelengths: past, present, perspectives." Laser & Photonics Reviews 11.3 (2017): 1600295. 11 pages.
Lee et al., Metasurface eyepiece for augmented reality. Nat Commun 9, 4562 (2018). https://doi.org/10.1038/s41467-018-07011-5. 10 pages.
Li et al., "Metalens-based miniaturized optical systems." Micromachines 10.5 (2019): 310. 21 pages.
Maguid et al., "Photonic spin-controlled multifunctional shared-aperture antenna array." Science 352.6290 (2016): 1202-1206.
Monochromatic 2.5-um pitch (10K DPI) 1080P MicroLED Display. Jade Bird Display. Accessed at https://www.jb-display.com/2-5-um-pitch on Sep. 12, 2019, 1 page.

(56) References Cited

OTHER PUBLICATIONS

Nagiel et al., "Ultra-widefield fundus imaging: a review of clinical applications and future trends." Retina 36.4 (2016): 660-678.
Optos Products. Accessed at https://www.optos.com/en/products/ on Sep. 11, 2020. 27 pages.
Panwar et al., "Fundus photography in the 21st century—a review of recent technological advances and their implications for worldwide healthcare." Telemedicine and e-Health 22.3 (2016): 198-208.
Patel et al., "Ultra-widefield retinal imaging: an update on recent advances." Therapeutic Advances in Ophthalmology 12 (2020): 2515841419899495. 12 pages.
Pe'er et al., "Measurement of choroidal melanoma basal diameter by wide-angle digital fundus camera: a comparison with ultrasound measurement." Ophthalmologica 220.3 (2006): 194-197.
Pugh et al., "Screening for diabetic retinopathy: the wide-angle retinal camera." Diabetes care 16.6 (1993): 889-895.
Shalaginov et al., "A single-layer panoramic metalens with> 170 {\deg} diffraction-limited field of view." arXiv preprint arXiv:1908.03626 (2019). 14 pages.
Shalaginov et al., "High-index-contrast dielectric metasurface optics for MWIR imaging (Conference Presentation)." Advanced Optics for Imaging Applications: UV through LWIR IV. vol. 10998. International Society for Optics and Photonics, 2019. 11 pages.
Shrestha et al., "Broadband achromatic dielectric metalenses." Light: Science & Applications 7.1 (2018): 1-11.
Staurenghi et al., "Scanning laser ophthalmoscopy and angiography with a wide-field contact lens system." Archives of Ophthalmology 123.2 (2005): 244-252.
Structured Light Took Kit. GitHub. Accessed at https://github.com/jhdewitt/sitk; first commit on Feb. 28, 2017; latest commit on Apr. 4, 2018, 5 pages.
Toslak et al., "Near-infrared light-guided miniaturized indirect ophthalmoscopy for nonmydriatic wide-field fundus photography." Optics letters 43.11 (2018): 2551-2554.
Toslak et al., "Trans-palpebral illumination: an approach for wide-angle fundus photography without the need for pupil dilation." Optics letters 41.12 (2016): 2688-2691.
Toslak et al., Trans-pars-planar illumination enables a 200° ultra-wide field pediatric fundus camera for easy examination of the retina. Biomedical Optics Express 11.1 (2020): 68-76.
Tseng et al., Metalenses: Advances and Applications. Adv. Opt. Mater. 6, 1-16 (2018). 16 pages.
Ultra-Wide Field Retinal Imaging Device. Nikon. Accessed at https://www.nikon.com/about/technology/product/retinal-imaging/index.htm on Sep. 14, 2020. 5 pages.
Wang et al., "Broadband achromatic optical metasurface devices." Nature communications 8.1 (2017): 1-9.
Wang et al., "Computational protein design with deep learning neural networks." Scientific reports 8.1 (2018): 1-9.
Wang et al., "Room-temperature oxygen sensitization in highly textured, nanocrystalline PbTe films: A mechanistic study." Journal of Applied Physics 110.8 (2011): 083719. 9 pages.

Wang et al., "Structural, electrical, and optical properties of thermally evaporated nanocrystalline PbTe films." Journal of applied physics 104.5 (2008): 053707. 6 pages.
Witmer et al., "Comparison of ultra-widefield fluorescein angiography with the Heidelberg Spectralis® noncontact ultra-widefield module versus the Optos® Optomap®." Clinical ophthalmology (Auckland, NZ) 7 (2013): 389. 6 pages.
Wu et al., "RetCam imaging for retinopathy of prematurity screening." Journal of American Association for Pediatric Ophthalmology and Strabismus 10.2 (2006): 107-111.
Yu et al., "Light propagation with phase discontinuities: generalized laws of reflection and refraction." science 334.6054 (2011): 333-337.
Zhang et al., "Electrically Reconfigurable Nonvolatile Metasurface Using Optical Phase Change Materials." CLEO: Science and Innovations. Optical Society of America, 2019. 2 pages.
Zhang et al., "Ultra-thin high-efficiency mid-infrared transmissive Huygens meta-optics." Nature communications 9.1 (2018): 1-9.
Zhong et al., "Large-area metalens directly patterned on a 12-inch glass wafer using immersion lithography for mass production." Optical Fiber Communication Conference. Optical Society of America, 2020. 3 pages.
Zhou et al., "Multilayer noninteracting dielectric metasurfaces for multiwavelength metaoptics." Nano letters 18.12 (2018): 7529-7537.
Extended European Search Report in European App. No. 20849340.3 dated Jul. 12, 2023, 23 pages.
He et al. "Polarization-insensitive meta-lens doublet with large view field in the ultraviolet region." 9th International Symposium on Advanced Optical Manufacturing and Testing Technologies: Meta-Surface-Wave and Planar Optics. vol. 10841. SPIE, 2019, 8 pages.
Liu et al. "Metasurface enabled wide-angle Fourier lens." Advanced Materials 30.23 (2018): 1706368, 8 pages.
Shalaginov et al., "High-index-contrast dielectric metasurface optics for MWIR imaging (Conference Presentation)." Advanced Optics for Imaging Applications: UV through LWIR IV. vol. 10998. International Society for Optics and Photonics, 2019. 13 pages.
Chinese Office Action with translation in Chinese App No. 202080056268.0 dated Dec. 13, 2023, 14 pages.
Chinese Search Report with translation in Chinese App No. 202080056268.0 dated Dec. 8, 2023, 6 pages.
First Examiner's Report in Canadian App. No. 3,146,753 dated Jan. 30, 2024, 3 pages.
Chinese Office Action and Search Report with translation in Chinese App No. 202080056268.0 dated May 15, 2024, 22 pages.
Office Action in Israeli App. No. 290397 dated Feb. 6, 2024, 3 pages.
Office Action with translation in Japanese App. No. 2022-507897 dated Feb. 2, 2024, 10 pages.
Chinese Office Action and Search Report with translation in Chinese App No. 202080056268.0 dated Jul. 31, 2024, 42 pages.

* cited by examiner

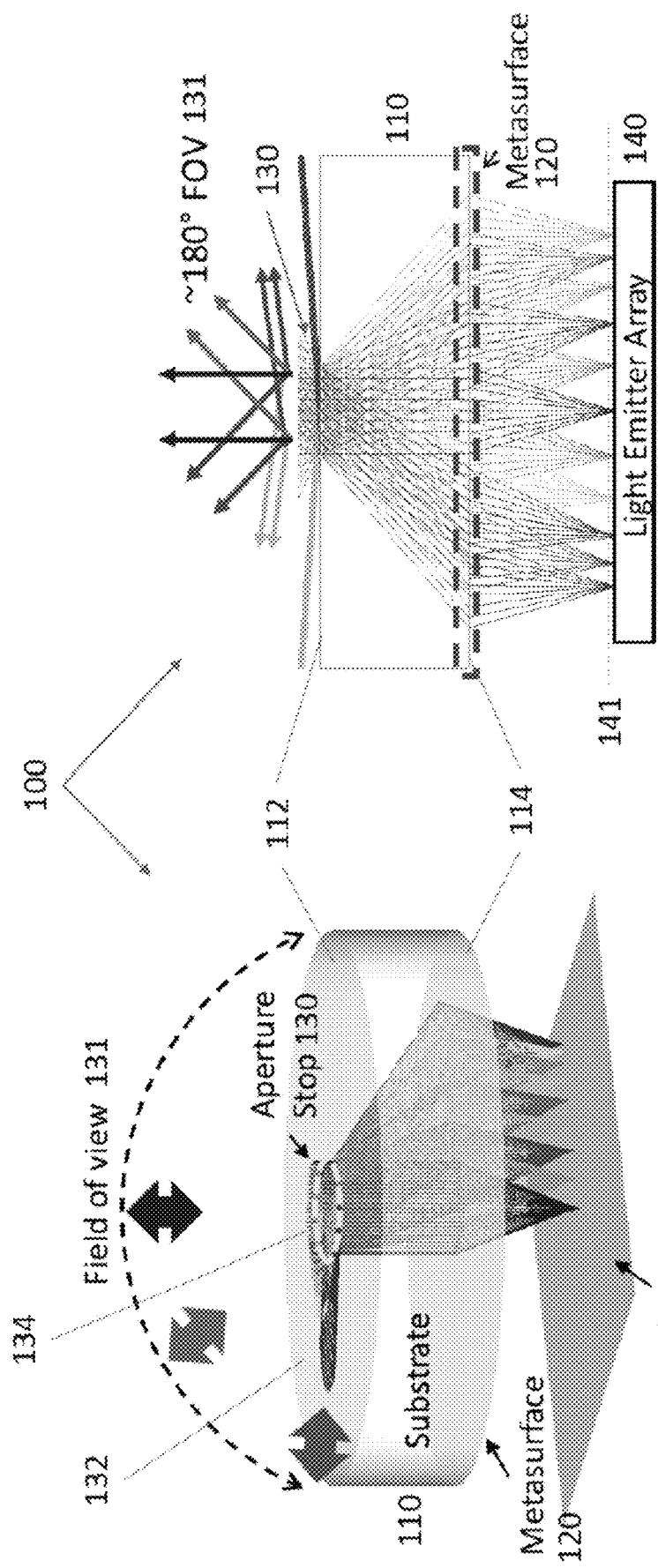

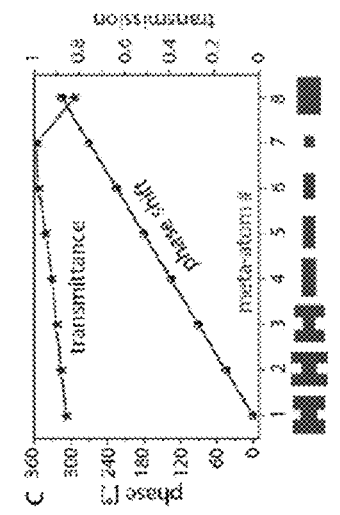
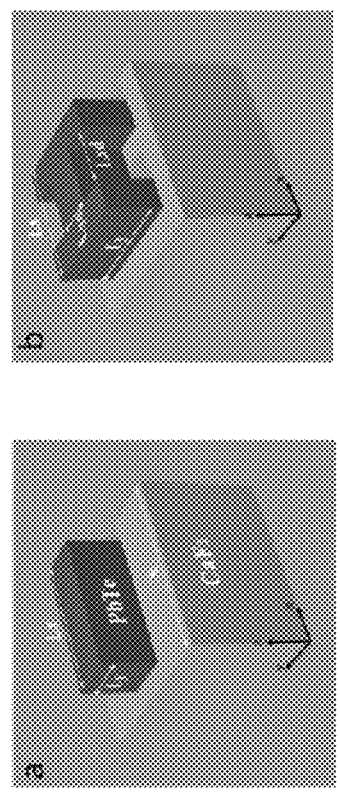
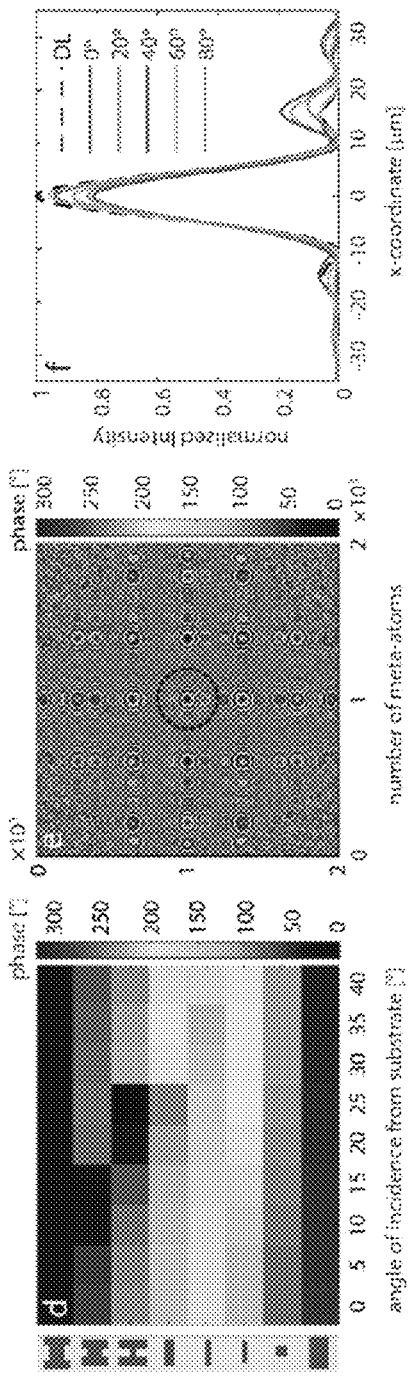

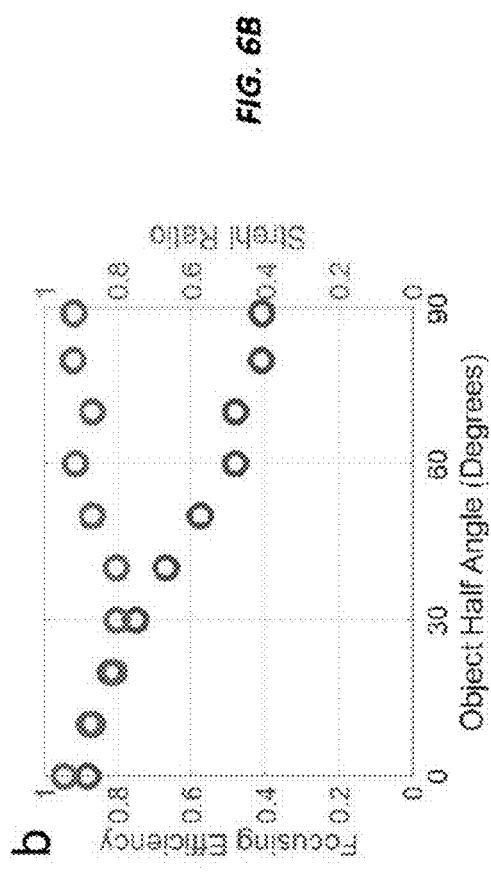
FIG. 6A
FIG. 6B
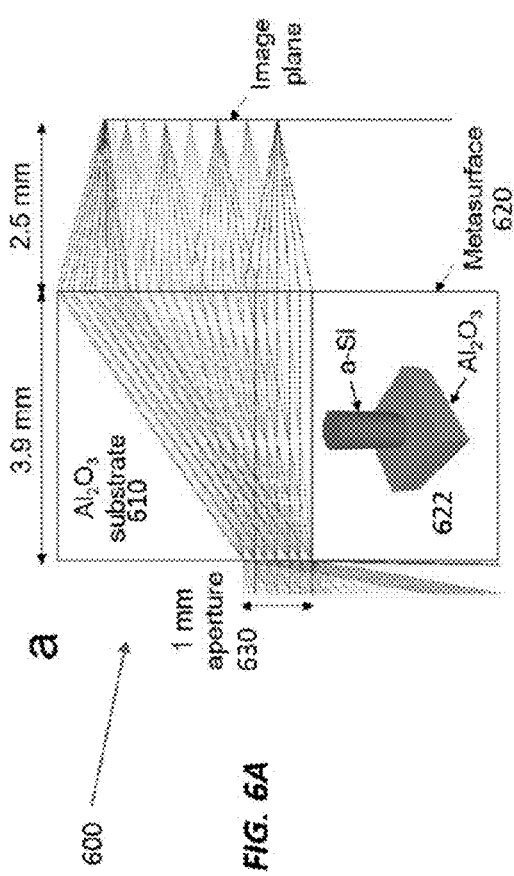
FIG. 6C
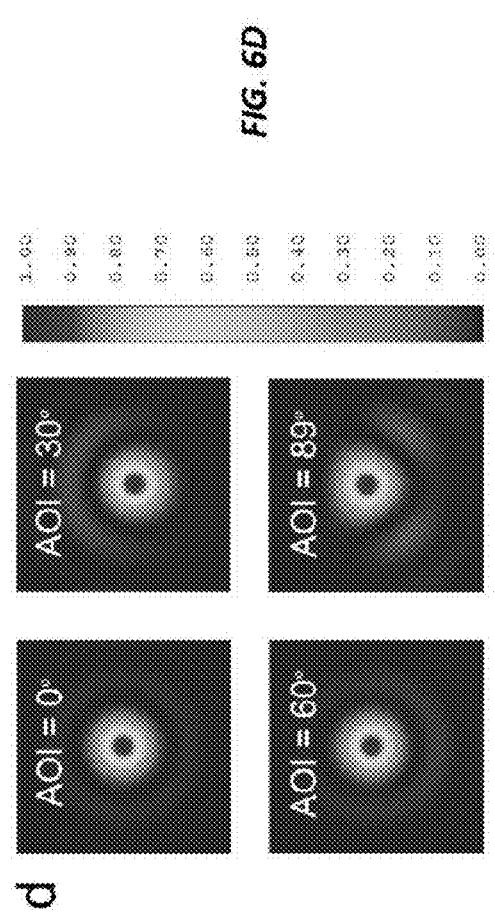
FIG. 6D
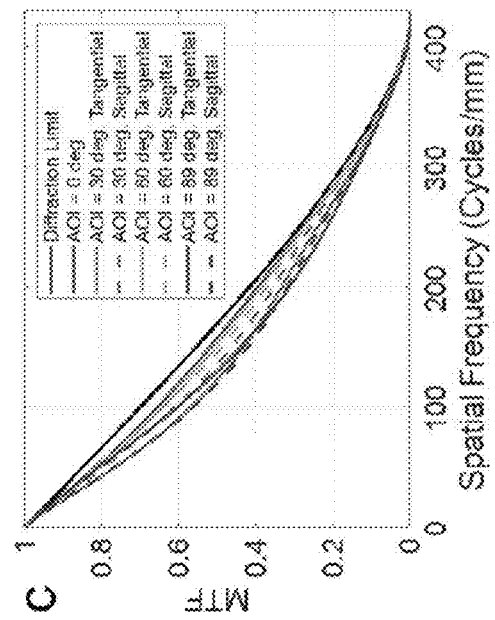

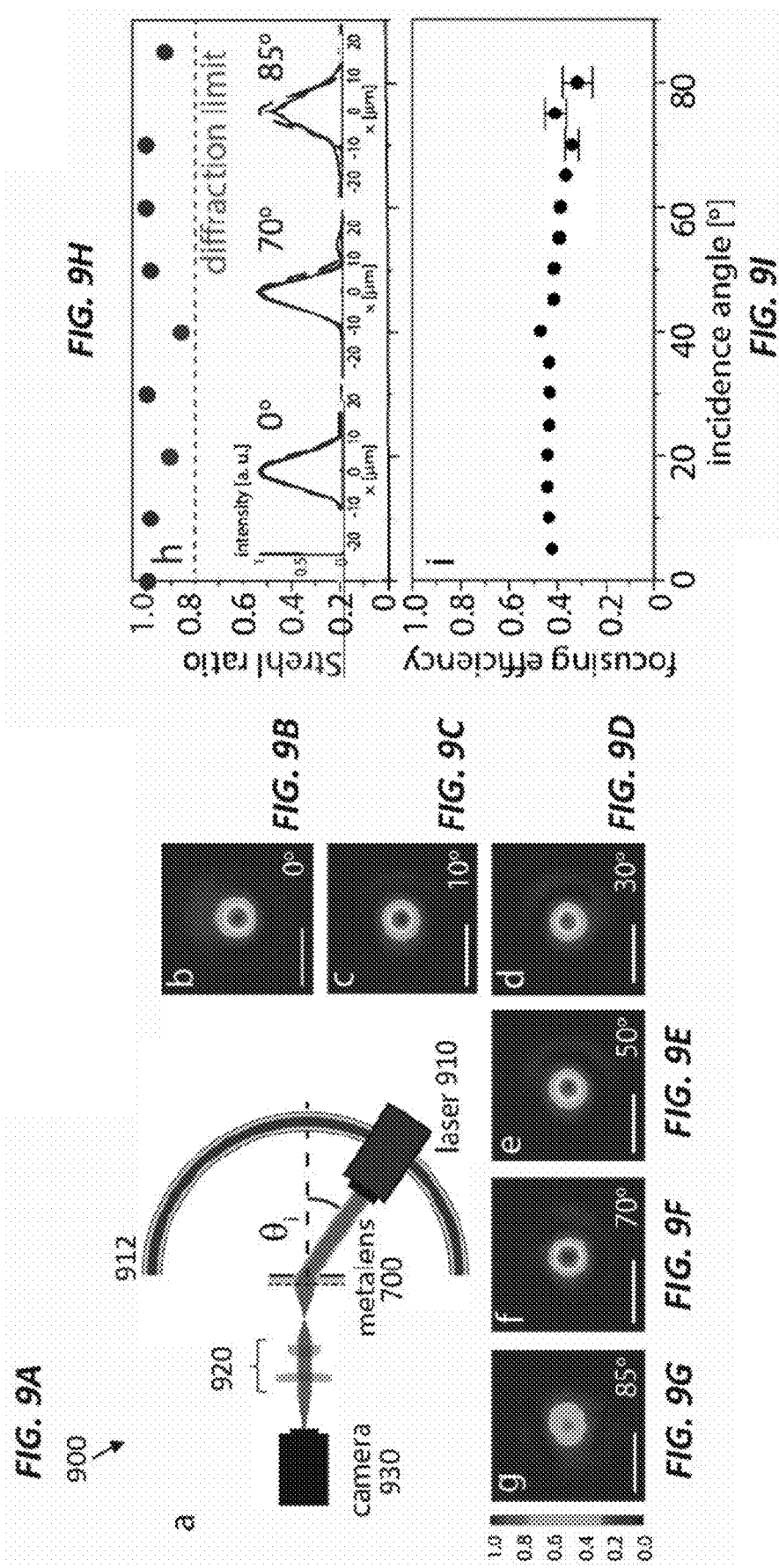

ULTRA-WIDE FIELD-OF-VIEW FLAT OPTICS

CROSS-REFERENCE TO RELATED APPLICATIONS

This application is a continuation of U.S. application Ser. No. 16/894,945, filed on Jun. 8, 2020, which claims the priority benefit, under 35 U.S.C. § 119(e), of U.S. Application No. 62/897,452, filed on Sep. 9, 2019, and of U.S. Application No. 62/884,645, filed on Aug. 8, 2019. Each of these applications is incorporated herein by reference in its entirety.

GOVERNMENT SUPPORT

This invention was made with government support under HR0011-17-2-0029 awarded by the Defense Advanced Research Projects Agency. The government has certain rights in the invention.

BACKGROUND

Wide-angle optical systems are vital to high performance imaging, detection, and image or beam projection. One of the earliest examples of a wide-angle optical system is the panoramic camera invented by Thomas Sutton in 1858. This panoramic camera included a single water-filled spherical lens that produced an image on a curved glass plate covered with reactive emulsion. Due to apparent difficulties in fabrication and handling of curved plates, this approach was soon abandoned but outlines the fundamental challenges achieving wide field-of-view imaging. Panoramic photography has since then been evolving along the path of planar detector planes while relying on compound lens assemblies, commonly known as fisheye lenses, to reduce optical aberrations at large field angles. Such a multi-lens architecture, however, increases the size, weight, and assembly complexity of optical systems.

Meta-surface lenses, or meta-lenses, are devices capable of controlling the phase, amplitude, and/or polarization of propagating light with arrays of subwavelength structures. Meta-lenses present a promising solution enabling flat and compact individual optical components. Meta-lens designs have been realized to mitigate several types of aberrations, in particular spherical and chromatic aberrations. However, it is still challenging to design meta-lenses that do not suffer from angle-dependent coma, field curvature, and astigmatism. These aberrations limit the usefulness of single-element meta-lenses.

The prevailing method for designing a single-element meta-lens utilizes a hyperbolic phase profile to realize a spherical wave front:

$$\phi_{ideal} = -\frac{2\pi}{\lambda}\left(\sqrt{f^2 + x^2 + y^2} - f\right) \quad (1)$$

where λ is the wavelength of incident light, x and y are the coordinates of meta-atoms, and f is the focal length of the meta-lens. This phase profile generates zero spherical aberration at the focal plane for a planar wave front at normal incidence but is not optimized for obliquely incident beams. When a beam strikes the meta-surface at an oblique incident angle ($\theta_{in\_x}$, $\theta_{in\_y}$), the desired phase profile becomes:

$$\phi_{oblique} = \frac{2\pi}{\lambda}\left\{\sqrt{f^2 + [x - f\tan(\theta_{in\_x})]^2 + [y - f\tan(\theta_{in\_y})]^2} - [x\sin(\theta_{in\_x}) + y\sin(\theta_{in\_y})]\right\} \quad (2)$$

The deviation between the two distributions at different angles of incidence (AOIs) results in third-order (Seidel) aberrations, such as coma, astigmatism, and field curvature. These aberrations limit the field-of-view of the meta-lens. As an example, assuming a baseline meta-lens design with 1 mm diameter and 2 mm focal length operating at a 5.2 µm wavelength, the conventional hyperbolic phase profile effectively suppresses spherical aberration and achieves diffraction-limited focusing with a unity Strehl ratio at normal incidence. However, at AOIs larger than about 7°, coma becomes dominant, reducing the Strehl ratio to below 0.8 and rapidly degrading the meta-lens's performance from diffraction limit. The small viewing angle significantly limits the use of a single meta-lens in imaging and image projection applications.

Several meta-lens designs have already been implemented to suppress coma and expand the diffraction-limited FOV. One approach involves engraving a meta-surface on a spherical surface, but this challenging. Another approach involves cascading multiple meta-surfaces based on traditional bulk optical system design principles. In such a doublet meta-lens design, the focusing function is primarily performed by one of the doublet's meta-surfaces while the other meta-surface acts to correct the off-axis aberrations. This type of double can achieve a diffraction-limited FOV up to approximately 56°. In comparison, the FOV of a conventional single-layer meta-lens is typically limited to about 30°, with a larger diffraction-limited spot size due to vignetting, a low optical efficiency of 6-20%, and sensitivity to assembly misalignment. Meta-lenses with wide-angle performance rivaling their traditional refractive counterparts have not been realized to date.

SUMMARY

Here, we present meta-lenses that can perform diffraction-limited imaging or beam/image projection over an extremely wide field of view (WFOV), e.g., of 120°, 130°, 140°, 150°, 160°, 170°, or even close to 180°. An example meta-lens is monolithically integrated on a one-piece flat substrate and includes an aperture on one side and a single meta-surface on the other side. The meta-surface corrects one or more third-order Seidel aberrations, including coma, astigmatism, and field curvature. The meta-lens further features a planar focal plane, which enables considerably simplified system architectures. This meta-lens can be used in imaging, imaging/pattern projection, display, augmented reality (AR), virtual reality (VR), three-dimensional (3D) sensing, holography, LIDAR, Fourier transform optics, etc. The meta-lens can be readily adapted to different subwavelength structures and diffractive optical elements (DOE), and wavelength ranges to meet diverse application demands.

A meta-surface on an inventive meta-lens may include an array of optically thin (e.g., 0.1 wavelengths to 10 wavelengths thick), subwavelength arrayed nano-antennae (also called meta-atoms) that can provide arbitrary control of the phase, amplitude, and/or polarization of an incident optical wave front. For imaging applications, an on-demand wave front manipulation approach allows eliminating image aberrations with many fewer lenses and other optical elements. As a result, an optical system based on an inventive meta-lens can have significant size, weight, performance, and cost (SWaP-C) advantages over a system made of traditional optical components.

An inventive optical component may comprise a (transparent) substrate, an opaque layer on a first side of the substrate, and a meta-surface on a second side of the substrate opposite the first side. The opaque layer defines an aperture to transmit light over a field of view of at least 120° (e.g., 130°, 140°, 150°, 160°, 170°, or higher). And meta-surface focuses the light transmitted by the aperture through the substrate.

The substrate can be planar or curved, with a thickness $t_{sub}$ and a refractive index at a wavelength of the light of $n_{sub}$. The aperture may have a diameter of $D_{in}$, in which case the meta-surface has a diameter $D_{meta} = D_{in} + t_{sub} \tan[\sin^{-1}(1/n_{sub})]$.

The meta-surface can be configured to focus the light incident over all of the field of view to a focal plane parallel to the second side of the substrate. In this case, the optical component may also include a detector array, in the focal plane, to detect the light focused by the meta-surface or a light source array in the focal plane, in which case the meta-surface can collimate or focus a beam emitted by the light source array. The aperture can be configured to emit this collimated or focused beam.

The meta-surface can focus the light incident over all of the field of view with a Strehl ratio of at least 80%. It may include an array of at least 1000×1000 meta-atoms. It can have different yet continuous portions configured to capture input beams at different angles of incidence. And it can correct at least one third-order Seidel aberration.

The optical component may also include a second meta-surface, disposed in at least a portion of the aperture, to filter or modulate the light transmitted by the aperture. For example, the second meta-surface can be configured to filter the light transmitted by the aperture or to modulate the phase, amplitude, polarization, and/or wavelength of the light transmitted by the aperture. For The second meta-surface can be configured to generate 2D or 3D optical patterns, images, dot arrays, hologram, etc. The modulation imparted by the second meta-surface may depend on the properties of the incident beam (e.g., angular, spatial, polarization, spectral properties, etc.). The second meta-surface can also be configured to vary the polarization of the light transmitted by the aperture or wavelength of the light transmitted by the aperture, for example, using nonlinear effects. The illumination patterns with customizable or reconfigurable spatial, angular, polarization, and/or spectral properties can be coupled with object reconstruction algorithms associated with such modalities to efficiently extract the properties of a scene.

Inventive meta-lenses can be used in sensors and other devices. For instance, an inventive sensor may include a substrate, a light source array supported by a first portion of the substrate, a first meta-lens, a second meta-lens, and a detector array supported by a second portion of the substrate. The first and second meta-lenses comprise respective planar substrates (or respective portions of the same planar substrate). Each meta-lens has a corresponding meta-surface on a first side of its planar substrate (portion) and a corresponding aperture on a second side of its planar substrate (portion) facing an object. In operation, the light source array emits light, which is projected by the first meta-lens toward the object over a field of view of at least about 120° (e.g., 130°, 140°, 150°, 160°, 170°, or higher). The second meta-lens collects the light scattered and/or reflected by the object over a field of view of at least about 120° (e.g., 130°, 140°, 150°, 160°, 170°, or higher). And the detector array detects the light collected by the second meta-lens.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIGS. 1A and 1B show perspective and profile views, respectively, of a WFOV meta-lens.

FIG. 2A shows a perspective view of a rectangular meta-atom for a WFOV meta-lens.

FIG. 2B shows a perspective view of an H-shaped meta-atom for a WFOV meta-lens.

FIG. 2C is a plot of the transmittance and phase shift at normal incidence for a WFOV meta-lens made of eight different PbTe meta-atoms, each with a thickness of 650 nm, and a lattice constant P of 2.5 μm along both the x and y axes. (The meta-atoms are shown below the plot.)

FIG. 2D is a plot of angle-dependent phase delay imparted by the meta-atoms: the meta-atoms are designed to be almost insensitive to the incident angle. The angle of 45.6° concurs with the angle of total internal reflection at the interface between air and calcium fluoride. The incident light is TM-polarized.

FIG. 2E is a plot of the meta-lens phase distribution, where the black dash-line circle at the center of the plot indicates the position of the aperture on the opposite side of the substrate.

FIG. 2F is a plot of simulated cross-sectional intensity distributions of focal spots under different angles-of-incidence (AOIs) for a WFOV meta-lens and a focal spot formed by a perfect lens of the same numerical aperture (NA) as the simulated WFOV meta-lens.

Figure 3:
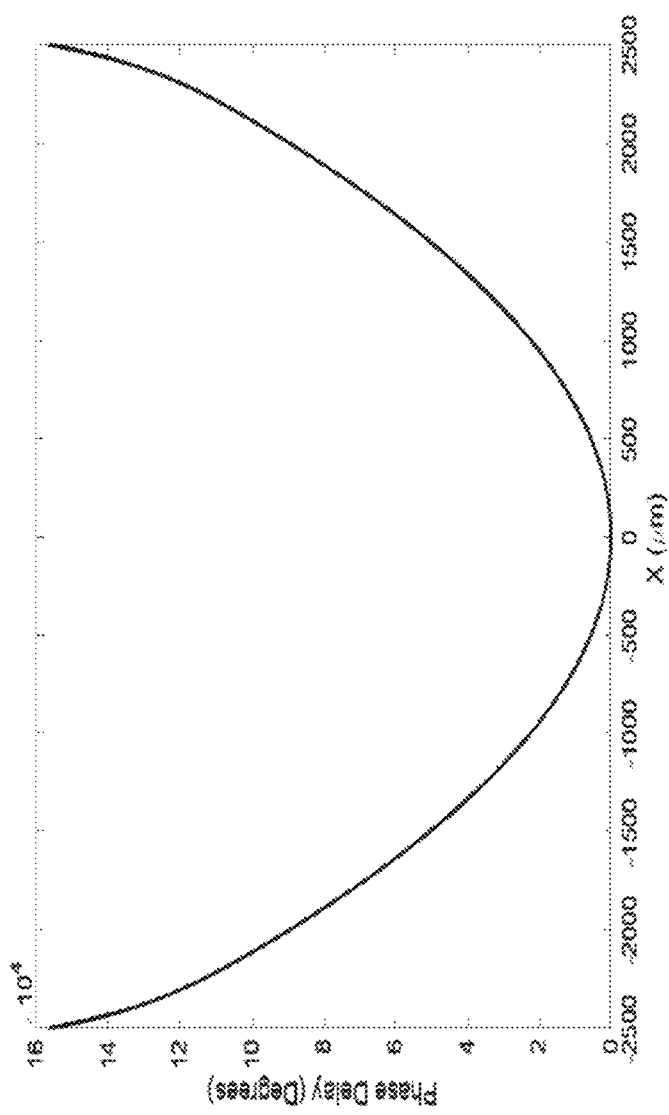

FIG. 3 is a plot of a phase profile of the WFOV meta-lens at y=0. The 2-D phase map is rotationally symmetric.

Figure 4:
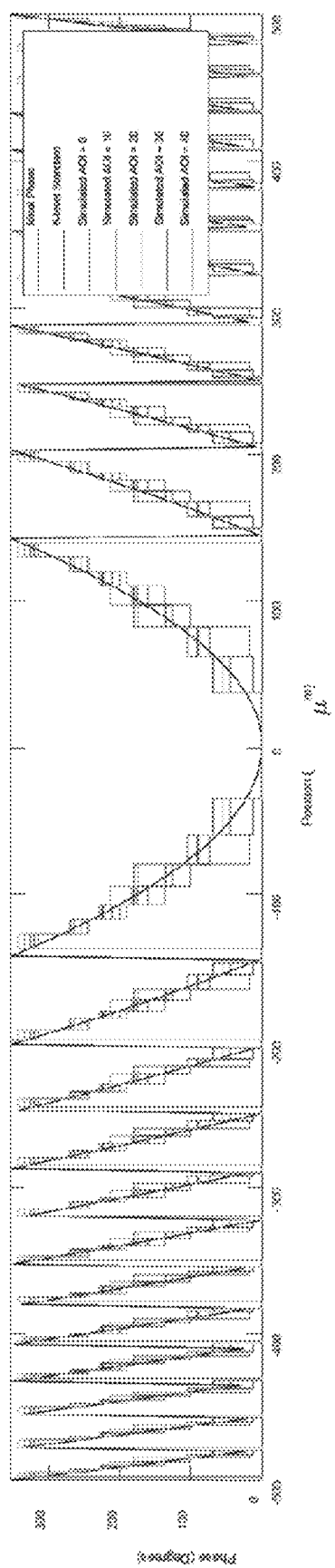

FIG. 4 is a plot of angle-dependent phase profiles of the central 1-mm-diameter region of a WFOV meta-surface.

Figure 5A:
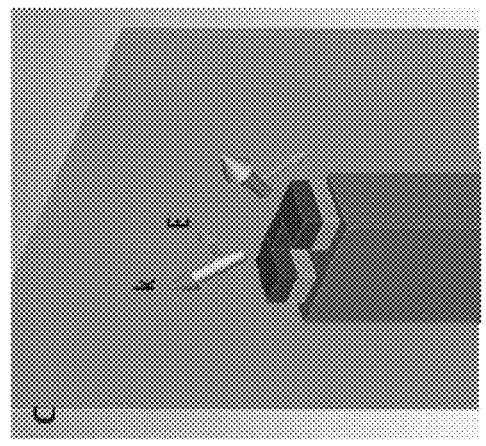

FIG. 5A shows an H-shaped meta-atom with linearly polarized light incident along the y-z plane.

Figure 5B:
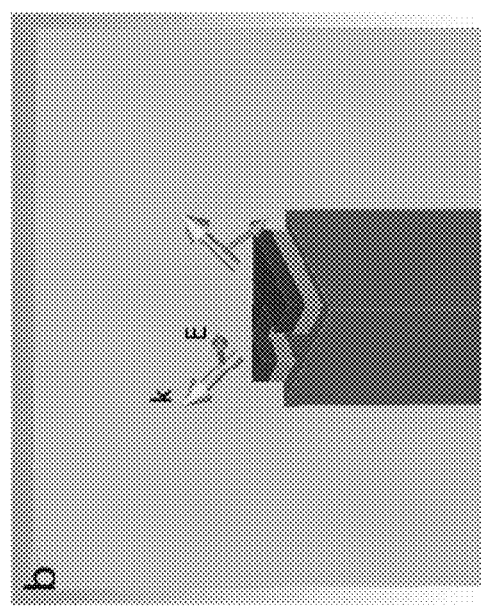

FIG. 5B shows an H-shaped meta-atom with linearly polarized light incident along a 45° plane.

Figure 5C:
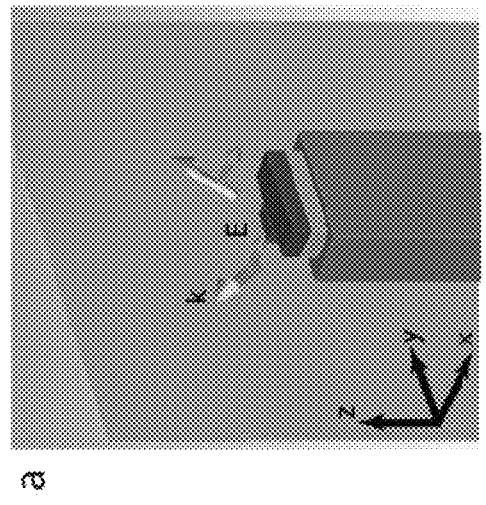

FIG. 5C shows an H-shaped meta-atom with linearly polarized light incident along the x-z plane (TM-polarized light).

Figure 5D:
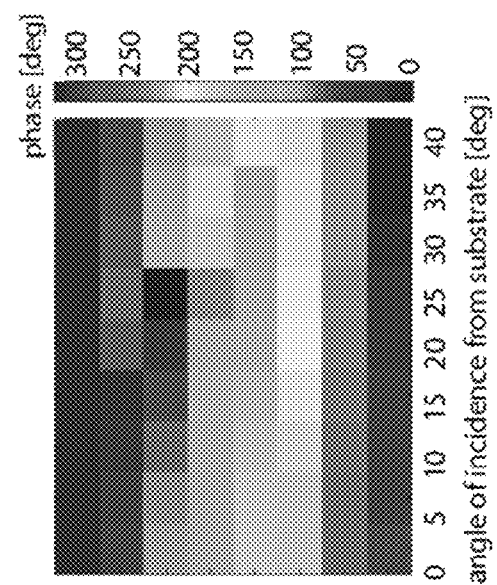
Figure 5E:
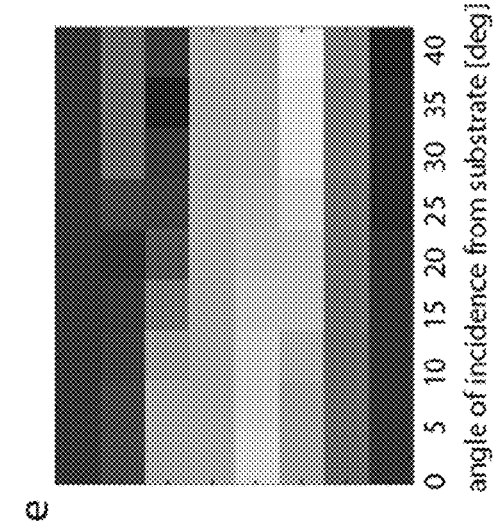
Figure 5F:
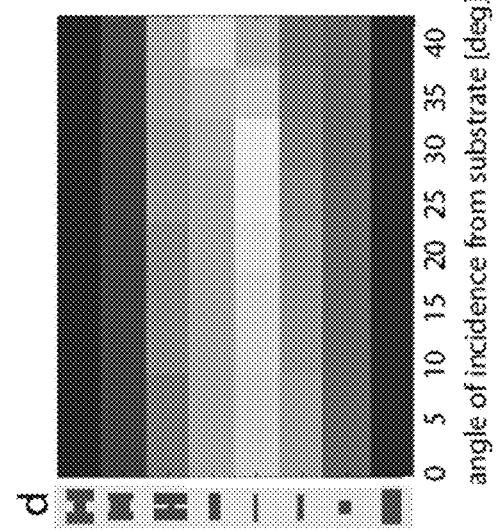

FIGS. 5D-5F shows meta-atom angular response for the different linear polarizations in FIGS. 5A-5C.

FIG. 6A shows a profile of a WFOV meta-lens designed to operate a wavelength of 940 nm. The inset shows a meta-atom configuration.

FIG. 6B shows the simulated Strehl ratio (right axis) and focusing efficiency (left axis) as a function of incidence angle from the WFOV meta-lens of FIG. 6A.

FIG. 6C shows simulated modulation transfer functions (MTFs) at different AOIs for the WFOV meta-lens of FIG. 6A and for a perfect lens with the same NA.

FIG. 6D shows focal spots of the WFOV meta-lens of FIG. 6A at different AOIs.

Figure 7A:

FIG. 7A shows an imaging simulation setup with source image positioned at an infinite distance away from a WFOV meta-lens (not drawn to scale).

Figure 7B:
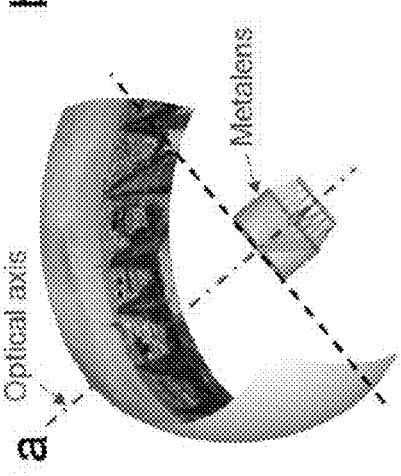

FIG. 7B shows a monochromatic source image covering 180° horizontal FOV for the imaging simulation setup of FIG. 7A.

Figure 7C:
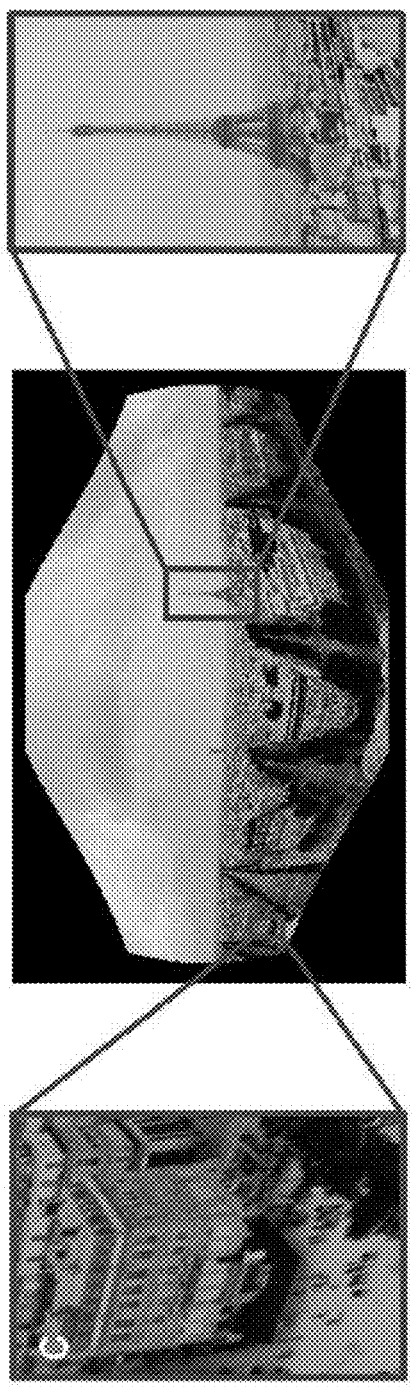

FIG. 7C shows a simulated panoramic image formed by the WFOV meta-lens in the imaging simulation setup of FIG. 7A.

Figure 8:
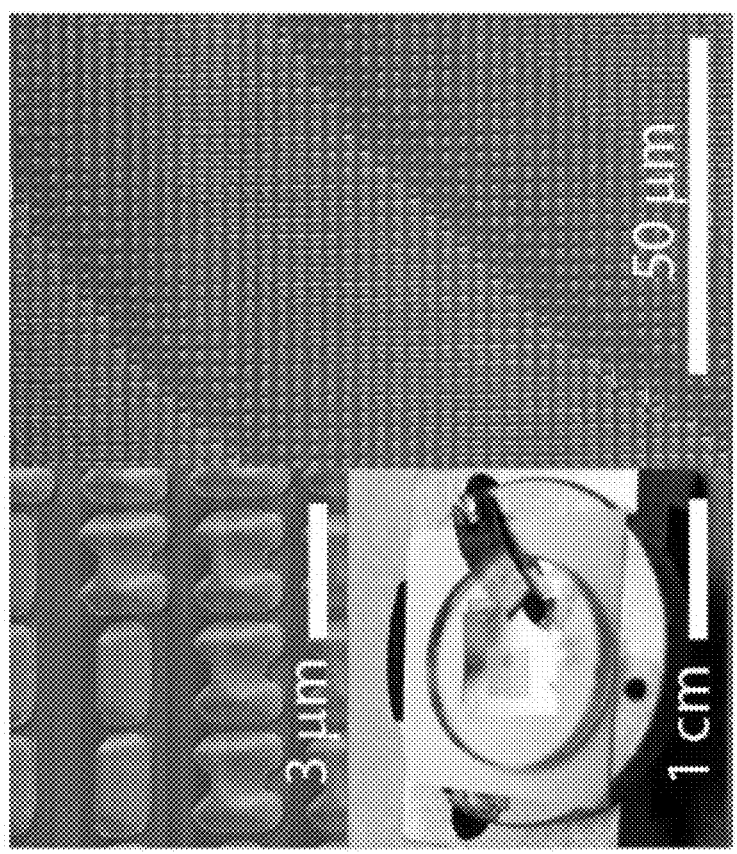

FIG. 8 shows a photograph (lower left) and scanning electron microscopy (SEM) images (upper left and right) of a fabricated meta-lens sample.

FIG. 9A is a schematic of experimental setup for imaging a focal spot produced by a WFOV meta-lens at various incidence angles.

FIGS. 9B-9G show focal spot intensity images for a WFOV meta-lens captured by the FPA camera in the setup of FIG. 9A at 0° (9B), 10° (9C), 30° (9D), 50° (9E), 70° (9F), and 85° (9G).

FIG. 9H is a plot of the Strehl ratio versus incidence angle for a WFOV meta-lens. The inset shows focal spot cross-sections at 0°, 70°, and 85° incident angles for the measured data (solid line) and theoretical results (dashed line) for an aberration-free lens with the same NA.

FIG. 9I is a plot of measured WFOV meta-lens focusing efficiency versus incidence angle.

Figures 10A, 10B:
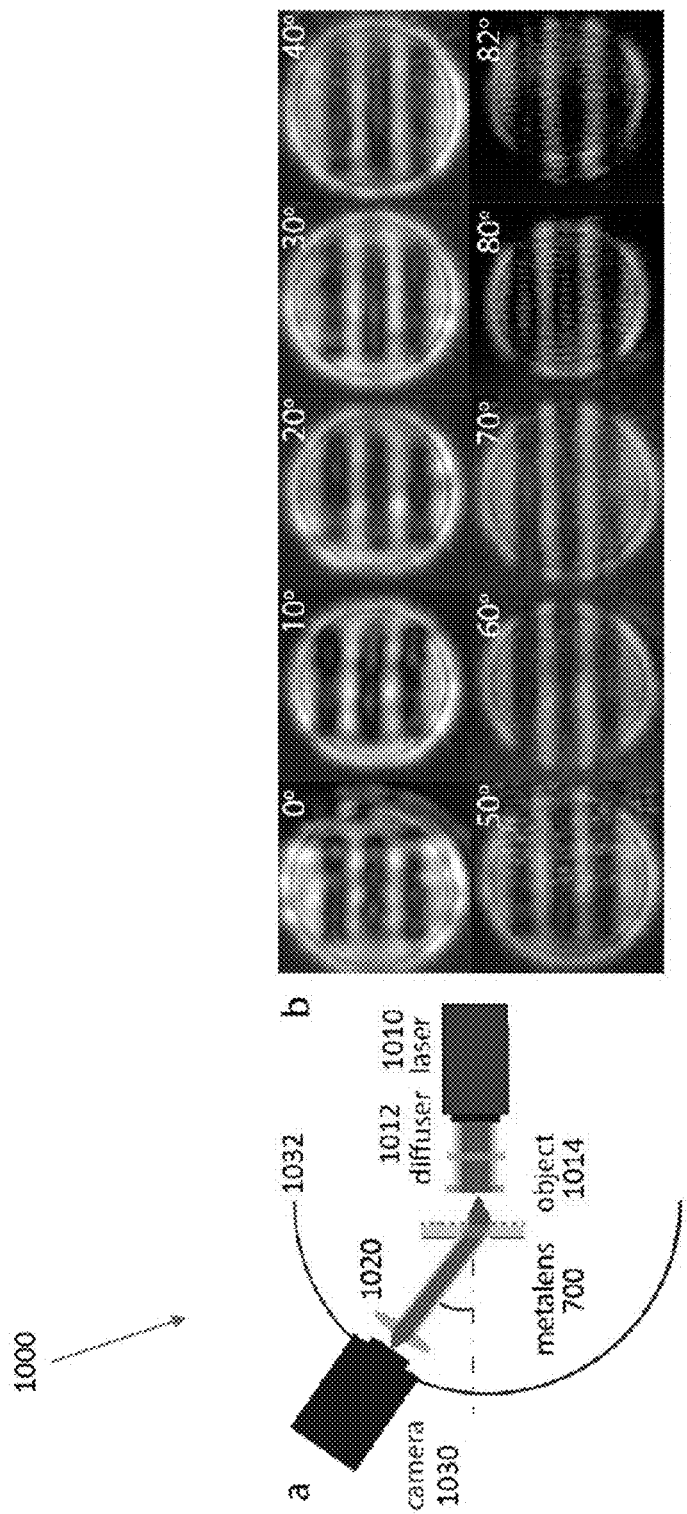

FIG. 10A is a schematic of an imaging setup for a WFOV meta-lens, where the object is illuminated by a laser beam. A pair of single-side polished silicon wafers in the optical path reduces spatial coherence of the illumination, thereby reducing speckles. The light scattered by the object is collected by the meta-lens and redirected to an FPA camera with attached compound lens.

FIG. 10B shows projected images of a 1951 USAF resolution test target with a line width of 15.6 µm at different angles as measured in the setup of FIG. 10A.

Figures 11A, 11B:
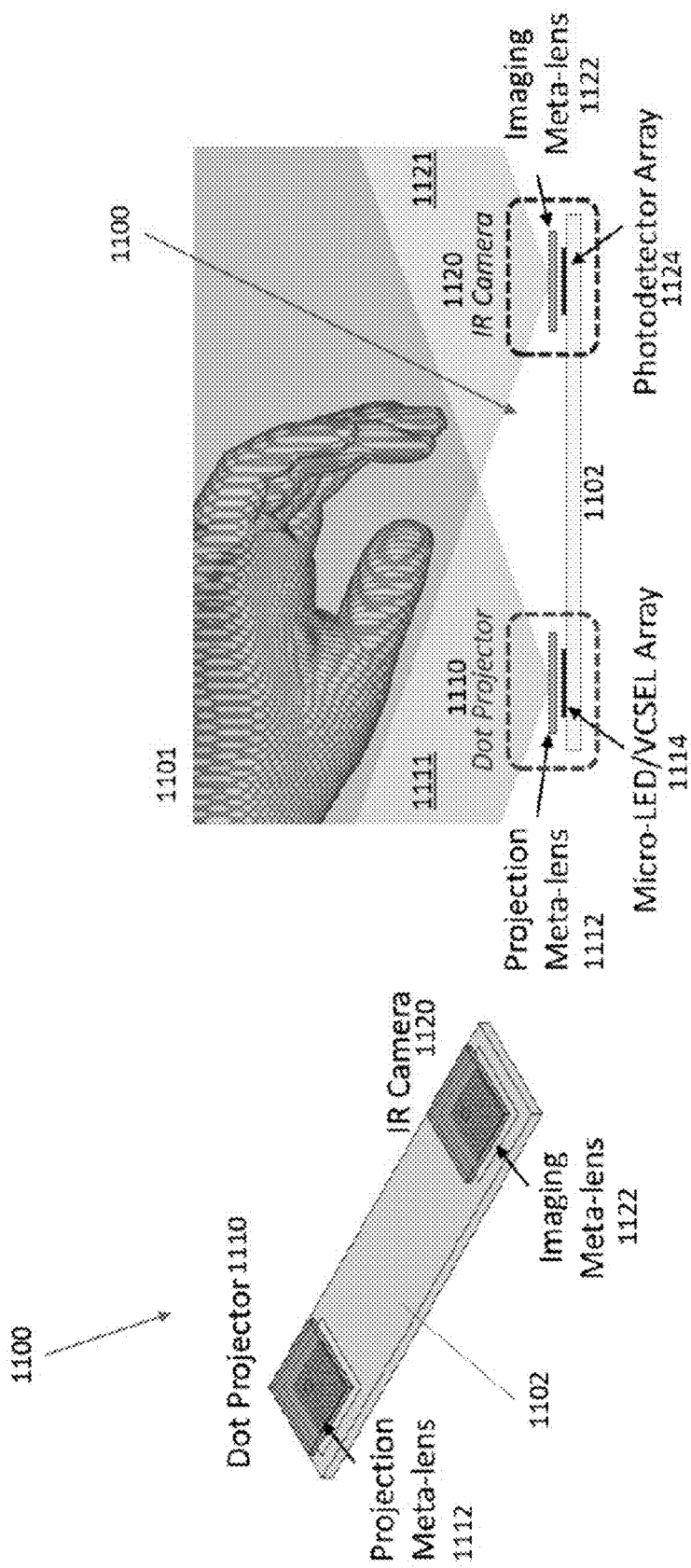

FIGS. 11A and 11B illustrate 3D sensing based on structured light using WFOV meta-lenses.

Figure 12:
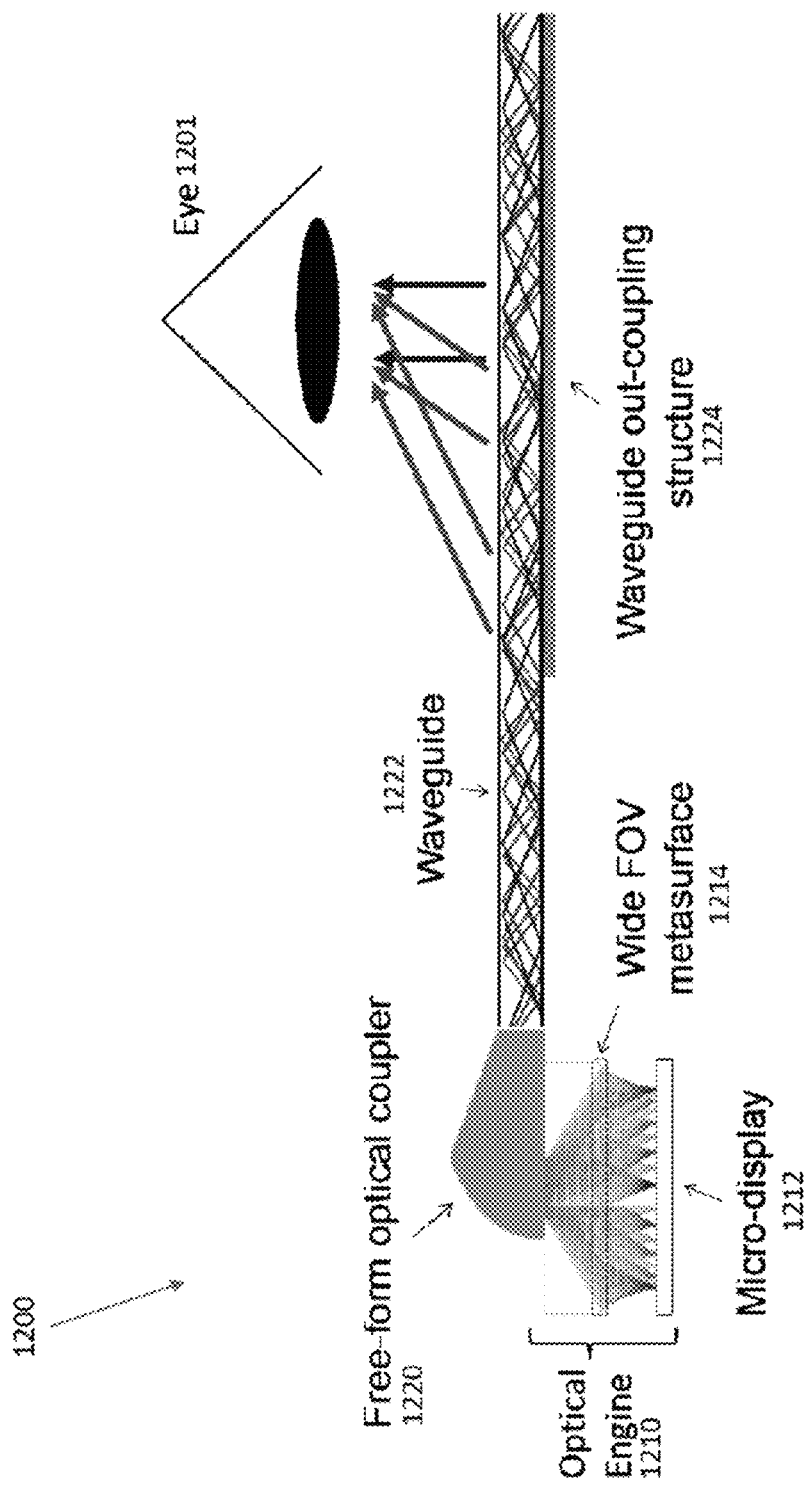

FIG. 12 shows a WFOV, ultra-compact, meta-display.

Figures 13A, 13B:
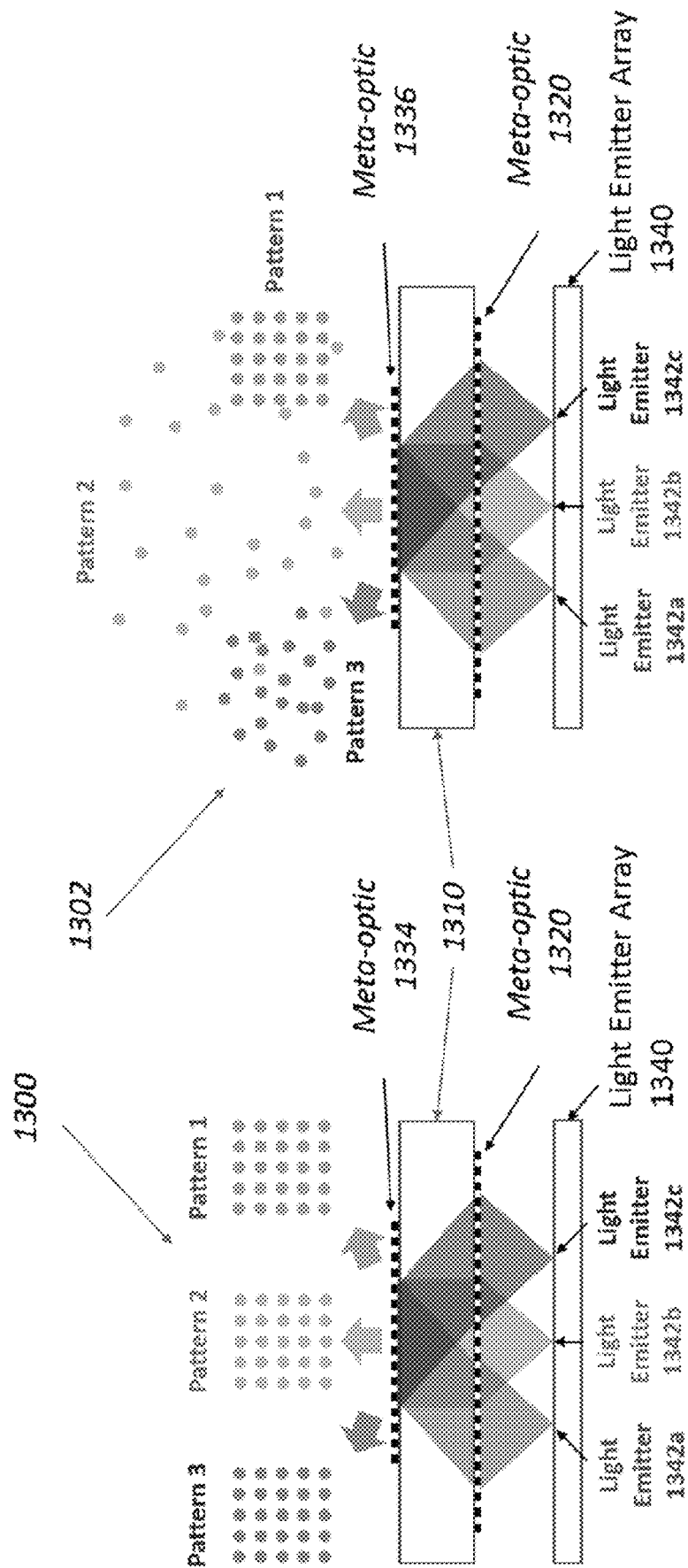

FIGS. 13A and 13B show profile views of a WFOV meta-lens with a second meta-surface in or defining at least a portion of the aperture.

DETAILED DESCRIPTION

An inventive wide field-of-view (WFOV) meta-lens has a simple and easy-to-fabricate configuration, with a single meta-surface layer and an aperture integrated on opposite sides of a single thin substrate. It can have a diffraction-limited FOV exceeding 170° and a planar focal plane, which significantly simplifies the associated detector (for imaging and detection) or light emitter (for image/beam projection, display, etc.) array design. It can operate at a wide range of wavelengths (e.g., from the visible to the infrared (IR)), depending on the design of the meta-surface and the substrate and meta-surface materials. A meta-surface can be designed to operate at any wavelength from the microwave to ultraviolet (UV) regions of the electromagnetic spectrum, with a bandwidth that spans up to an octave.

Moreover, the WFOV meta-lens design principles disclosed here are generic and applicable to arbitrary meta-atom configurations and wavelength ranges to meet diverse application demands. With a proper meta-surface, a meta-lens can be a panoramic meta-lens with broadband operation and polarization diversity. As another example, nano-rod or nano-pillars can be used for polarization-insensitive designs. A variety of meta-surface materials systems can be chosen for desired wavelength ranges, including, for example, PbTe and $CaF_2$, and a-Si and $Al_2O_3$.

A WFOV meta-lens can be implemented using a Huygens meta-surface with an ultra-thin meta-atom profile. A Huygens meta-surface can be fabricated easily but may constrain sensitivity to wavelength and polarization. In any event, the WFOV design described herein is generic and applicable to arbitrary meta-atom configurations. With a proper choice of meta-atoms, the meta-lens can perform panoramic imaging (e.g., a FOV exceeding 170°) over a broadband with polarization diversity.

Thanks to their extremely WFOVs, planar surfaces, and flat focal plane, inventive meta-lenses are particularly well suited for sensing, image projection, lidar, imaging, optical projection, augmented reality/virtual reality, beam steering, and 3-D sensing applications. For example, the beam projection function of an inventive device can be used for LIDAR systems, when the light emitters are individually modulated or switched on and off to steer, switch, or tune the output beams for wide-angle illumination. The same WFOV meta-lens can be used in the detection module for wide-angle signal collection.

A Wide Field-of-View (WFOV) Meta-Lens

FIGS. 1A and 1B show perspective and profile views, respectively, of an example WFOV meta-lens 100. The meta-lens 100 includes a single substrate 110 with an input aperture 130 positioned on one surface 112 and a meta-surface 120 positioned on the other surface 114. The substrate 110 has a refractive index of $n_{sub}$ and a thickness of $t_{sub}$. Light beams incident on the input aperture 130, which has a diameter of $D_{in}$, at different incidence angles $\theta_{in}$ are refracted to the backside meta-surface 120, which has a total diameter of $D_{meta}$, and are focused onto a planar focal plane 141.

The substrate 110 may be made of any suitable material that transmits light at the meta-lens's operating wavelength. The substrate 110 may be rigid, flexible, or stretchable. It can be flat/planar on both sides as shown in FIGS. 1A and 1B or warped, curved, or bent, depending on the application. Suitable substrate materials include but are not limited to halide crystals, sapphire and other oxide crystals, quartz, chalcogenide crystals, glass (e.g., oxide, chalcogenide, as well as other types of glass), plastic, or semiconductor materials.

The meta-surface 120 includes an array of sub-wavelength optical structures (also known as meta-atoms; described and shown below) that modify the amplitude, phase, and/or polarization of incoming wave fronts. These meta-atoms can have the same or different shapes, sizes, and orientations. For example, they can be rectangular, cylindrical, H-shaped, or L-shaped. They are arrayed on a lattice with a pitch that is less than or equal to the operating wavelength of the meta-lens 100. The lattice can have any suitable period and shape (e.g., square, rectangular, or hexagonal). The lattice can also be aperiodic, for example, with spacing defined by the gap between adjacent meta-atoms, such as a constant gap distance, or with randomly positioned meta-atoms, which are patterned to provide a desired phase profile over the entire meta-surface 120.

The meta-atoms are made of transparent material (e.g., the same material as the substrate 110, with the meta-atoms formed by patterning one side of the substrate 110). The meta-atoms' shapes, sizes, and layout can be selected so that the meta-surface's spectral response does not change with AOI—the optical phase/amplitude change imparted by the meta-atoms with varying AOI is automatically accounted for in their design. The meta-surface 120 can also be designed for rotationally asymmetric focusing (e.g., focusing at some AOIs but not others).

(Alternatively, the meta-surface 120 can be replaced by a meta-material, multi-layer meta-surfaces, or diffractive optical element (DOE) that provides the same or similar effective phase profile. For instance, a DOE could be implemented as a binary or multi-level grayscale DOE with a feature size that is larger than the lens's operating wavelength. Similarly, the overall lens architecture works for non-diffractive optical lenses.)

The aperture stop 130 is defined by a layer 132 of opaque (e.g., absorptive or reflective) material on the upper surface 112 of the substrate 110. The upper surface 112 can also define or be partially or fully covered with a meta-surface (not shown) that modulates the intensity and/or phase of the incident light to form an effective aperture stop. (Alternatively, this meta-surface can be replaced by a metamaterial, multi-layer meta-surfaces, or DOE.) The aperture stop 130 can be circular with a diameter given by:

$$D_{in}=D_{meta}-2t_{sub}\tan[\sin^{-1}(1/n_{sub})]$$

This diameter can range from microns to millimeters, with a numerical aperture (NA) that ranges from 0 to 1. The numerical aperture can higher (e.g., 1.5) if the meta-lens is immersed in oil or other high-index material.

The aperture can also be square, elliptical, hexagonal, rectangular, or any other suitable shape. Alternatively, the aperture can include one or more sub-regions, patches, or arrays configured to modulate or encode the input light in spectrum, phase, amplitude, polarization, etc. For example, at least a portion of the aperture 130 may be patterned with another meta-surface 134 that filters light passing through the aperture 130. If desired, the edge of the aperture stop 130 can be apodized, e.g., with a Gaussian or super-Gaussian apodization, to reduce deleterious edge effects.

By spatially decoupling the meta-surface 120 and aperture stop 130 while positioning them on the same substrate, the meta-lens 100 can capture input beams at different angles of incidence (AOIs) on different yet continuous portions of the meta-surface 120, facilitating local optimization of the phase profiles, e.g., by optimizing against a figure of merit that accounts for focusing quality at multiple AOIs. The meta-surface phase profile is designed so that the root-mean-square (RMS) wave front error from an ideal spherical wave front over the input aperture is always smaller than 0.0745 wavelengths. This ensures that the meta-lens 100 has a Strehl ratio of over 80% over its entire field-of-view, which can be 120°, 130°, 140°, 150°, 160°, 170°, 175°, 179°, or nearly 180° for a flat substrate, thereby achieving diffraction-limited performance at various light illumination conditions. For meta-lens with a curved, bent, or warped substrate, the field-of-view can be even larger than 180°. Similar to the flat surface case, the incident light is refracted (or diffracted using a meta-surface) from the input aperture to the backside meta-surface. Conventional fisheye lenses achieve FOV>180° using a largely curved front lens.

The meta-lens 100 can operate at any of a variety of wavelengths, depending on its dimensions, the meta-surface design, and the substrate material. For example, a meta-lens 100 designed to operate at a wavelength of 5.2 μm may have a 2-mm-thick calcium fluoride (CaF$_2$) planar substrate 110 ($n_{sub}$=1.4 at 5.2 μm) with a 1-mm-diameter circular aperture 130 and a 5.2 mm×5.2 mm meta-surface 120. This meta-surface 120 may contain an array of 2,000×2,000 Huygens meta-atoms made of PbTe with a square lattice constant of 2.5 μm. The meta-surface 120 can have a constant focal length of 2 mm, corresponding to an effective numerical aperture (NA) of 0.24. At an incident angle of nearly 90°, the maximum angle of light propagation inside the substrate is 45.7°. As shown below, the phase response of the meta-atoms making up the meta-surface 120 depends only weakly on the beam incident angles within meta-lens's WFOV.

The meta-lens 100 operates differently than a meta-lens designed with separated angular channels, in which non-overlapping regions on a meta-surface are dedicated to beams at different AOIs. Because it has dedicated non-overlapping regions, a meta-lens with separated angular channels can only achieve high-quality focusing for a discrete set of incident angles. In an inventive meta-lens 100, the judiciously designed meta-surface phase profile and meta-lens architecture allow diffraction-limited focusing of beams with continuously varying incident angles and mutually overlapping beam profiles on the meta-surface side 114 of the substrate 110. Therefore, the meta-lens 100 can achieve aberration-free beam focusing or beam collimation and thus image projection for any light direction from or to any point on the front hemisphere.

In addition to correcting aberrations such as coma and astigmatism, the meta-lens 100 features a planar focal plane 141 across the entire FOV. The elimination of Petzval field curvature is beneficial in a wide range of applications, including imaging and image projection, by facilitating standard planar detector or emitter array integration. For example, FIG. 1B shows an array of light sources 140 in the focal plane 141 for projecting collimated beams at different angles with the meta-lens. The light sources 140 in the array may be light emitting diodes (LEDs), lasers, or any other (apertured) light sources. The array of light sources 140 array may include different light sources emitting at different wavelengths. The light sources 140 may also include broadband or wavelength-tunable light sources, depending on the application. (For imaging applications, the light sources 140 can be replaced by a planar detector array, such as a CMOS or CCD array, in the focal plane 141.)

Meta-Lens Meta-Surface Design and Modeling

A meta-lens can be designed utilizing a hierarchical combination of full-wave simulations (such as finite-element method (FEM), finite-difference time-domain (FDTD) method, and finite integration technique (FIT)) and Kirchhoff diffraction integral. At the sub-wavelength-scale, full-wave simulations can be used to design and model the meta-atoms in the meta-surface for desired optical responses. At the macroscopic system level, the diffraction integral method incorporating the full wave simulation results enables computationally efficient validation of the focusing characteristics of the entire meta-lens and can be used to optimize the phase profile of the meta-surface.

FIGS. 2A-2F illustrate the design and modeling of Huygens meta-atoms for the meta-surface on one side of a meta-lens that operates at a wavelength of 5.2 μm. Each Huygens meta-atom comprises either a rectangular or an H-shaped block made up of PbTe resting on a CaF$_2$ substrate as illustrated in FIGS. 2A and 2B, respectively. The combination of PbTe and $CaF_2$ is chosen to take advantage of these materials' low optical losses and giant refractive contrast in the mid-IR spectral range, enabling meta-surface operation in the transmissive mode while supporting both electric diploe (ED) and magnetic dipole (MD) resonances. Their shapes were designed to obtain spectrally overlapping ED and MD resonances at the operation wavelength, conducive to full 360° (2π) phase coverage with near-unity transmittance leveraging the Kerker effect. The meta-atom library includes eight different meta-atoms covering the 360° phase space with a discrete step of 45° for linearly TM-polarized light at 5.2 µm wavelength.

FIG. 2C shows simulated amplitude and phase responses of each of the eight meta-atoms in the meta-atom library at normal incidence. The meta-atoms are shown below the plot in FIG. 2C and include three H-shaped meta-atoms and five rectangular atoms. The meta-atom dimensions are listed in TABLE 1 (below).

TABLE 1

Dimensions of meta-atoms used in the meta-optical devices.

| | Meta-atom number | | | | | | | |
|---|---|---|---|---|---|---|---|---|
| | 1 | 2 | 3 | 4 | 5 | 6 | 7 | 8 |
| $L_x$ ($L_{xd}$) | 2.0 (0.6) | 1.8 (0.6) | 2.0 (0.7) | 2 | 1.78 | 1.38 | 0.62 | 2 |
| $L_y$ ($L_{yd}$) | 1.7 (0.9) | 1.9 (0.8) | 1.6 (0.7) | 0.78 | 0.7 | 0.66 | 0.52 | 1.26 |

FIG. 2D shows the simulated phase shift of each meta-atom at oblique AOIs (inside the substrate). The incident light is TM-polarized. The results indicate that the meta-atom responses are only weakly dependent on incident angle because the meta-atoms are designed to be almost insensitive to the incident angle. The angle of 45.6° concurs with the angle of total internal reflection at the interface between air and calcium fluoride. This all-dielectric Huygens metasurface platform underlies the high performance of the WFOV meta-lens.

FIG. 2E shows the phase distribution for a meta-lens with a 2000×2000 meta-atom array for the meta-surface. The black dash-line circle at the center of the plot indicates the position of the aperture on the side of the substrate opposite the meta-surface.

FIG. 2F shows simulated cross-sectional intensity distributions of focal spots under different AOIs and focal spot formed by a perfect lens of the same NA. The intensity distributions are asymmetric due to the oblique AOIs. The peak amplitude decreases with increasing AOI, with more light appearing in the sidelobes. The RMS phase errors compared to the ideal phase profile at all AOI values (Eq. 2) are consistently less than 0.0745 wavelength, ensuring Strehl ratios better than 0.8. As a result, when compared to a perfect lens with the same NA and focal length, the meta-lens design achieves diffraction-limited focusing and imaging performance across the entire FOV. The modulation transfer functions (MTFs) of the simulated focal spots in FIG. 6 further support this conclusion.

The meta-atom simulations illustrated in FIGS. 2A-2F were carried out with a frequency domain solver in the commercial software package CST Microwave Studio. For each meta-atom, unit cell boundary conditions were employed at both negative and positive x and y directions, while open boundary conditions were set along the z-axis. Each meta-atom was illuminated from the substrate side with an x-polarized plane wave pointing towards positive z direction. The results shown in FIG. 2C are the phase and amplitude of the complex transmission coefficient derived between the two open ports placed at the top and bottom of each meta-atom.

The focusing and imaging behavior of the WFOV meta-lens was modeled following the Kirchhoff diffraction integral, a physically rigorous form of the Huygens-Fresnel principle. The model starts with computing the Huygens point spread function of the optical system. It incorporates angular-dependent phase profiles at the meta-surface and propagates wave fronts emitted from each meta-atoms with corresponding amplitude and phase to the image plane where its complex amplitude is derived. The diffraction of the wave front through space is given by the interference or coherent sum of the wave fronts from the Huygens sources. The intensity at each point on the image plane is the square of the resulting complex amplitude sum.

The initial optical structure and phase profile of the meta-lens can be designed using OpticStudio® (Zemax, LLC). An analytical model based on the Kirchhoff diffraction integral can be subsequently utilized to analyze the full meta-surface performance under different AOIs. The analytical model incorporates angular-dependent phase masks following individual meta-atom responses under different AOIs obtained from full-wave simulations (e.g., as in FIGS. 5A-5F, described below). The phase profile optimization process involves iterative evaluation between OpticStudio® and the Kirchhoff diffraction integral model on the focal spot quality, i.e., Strehl ratio at different AOIs ($SR_{AO(i)}$). The following merit function (figure of merit, FOM) is maximized using numerical optimization:

$$FOM = \sum_i w_{AOI(i)} \cdot SR_{AOI(i)},$$

where $w_{AOI(i)}$ gives the weighting factor at different AOIs. This form of FOM simultaneously examines multiple beams over the entire FOV. For the exemplary design, an initial angular interval of ΔAOI==5° between neighboring beams is sufficient to sample the entire FOV continuously. The optimized meta-lens phase profile is shown in FIG. 2E. Compared to the ideal phase profile, the designed phase profile leads to Strehl ratios better than 0.8 at all AOI values. As a result, when compared to a perfect lens with the same NA and focal length, the meta-lens achieves diffraction-limited focusing and imaging performance across the entire FOV as shown by FIG. 2F.

The commercial optical design software Zemax OpticStudio can be used to obtain the initial phase profile of the meta-surface under ideal conditions. The rotationally symmetric phase profiles are expressed in a polynomial form:

$$\phi(\rho) = \sum a_n \left(\frac{\rho}{R}\right)^{2n}$$

where $\phi(\rho)$ is the desired phase response of specific meta-atoms with $\rho = \sqrt{x_2 + y_2}$, $a_n$ are aspheric coefficients, and R is the normalization radius. TABLES 1 and 2 (below) show the normalization radii and aspheric coefficients for example mid-IR and NIR WFOV meta-lenses, respectively:

TABLE 1

Phase profile design coefficients for mid-IR WFOV meta-lens

| | | | R (mm) | | | |
|---|---|---|---|---|---|---|
| a1 | a2 | a3 | a4 | a5 | a6 | a7 |
| 2.219e−3 | −1492.12 | 232.31 | −916.34 | 2179.49 | −2829.43 | 1837.91 | −467.25 |

TABLE 2

Phase profile design coefficients for NIR WFOV meta-lens

| | | | | R (mm) | | | | | |
|---|---|---|---|---|---|---|---|---|---|
| a1 | a2 | a3 | a4 | a5 | a6 | a7 | a8 | a9 | a10 |
| 2.25e−3 | −6708.07 | 63.55 | −175.6 | 290.48 | −264.77 | 106.33 | 16.11 | −34.28 | 12.98 | −1.69 |

Optimization starts with a standard hyperbolic phase profile consistent with the optical system specifications (e.g., focal length and f/#) over a small AOI range as the initial input. Once the initial optimization cycle converges for the starting AOI range, the result is used as the input for the next optimization iteration cycle with an expanded AOI range. The process continues till the final result converges over a targeted AOI range (e.g., ±90°).

More specifically, numerical optimization using the Levenberg-Marquardt algorithm (also known as the damped least-squares method) is implemented to maximize the merit function (e.g., the FOM defined above) in each optimization cycle. The Kirchhoff diffraction integral is used to numerically calculate the Strehl ratio at each field angle as well as the FOM. Angular-dependent responses of each meta-atoms are also incorporated to generate angular-dependent phase masks after spatial and phase discretization/mapping of the initial phase profile. In each optimization cycle, a FOM with equal weights for all AOIs over the range is initially used and maximized. Maximizing this equal-weight FOM can sometimes result in Strehl ratios less than 0.8 at some field angles. In this case, the optimization is repeated with adjusted weighting factors until the Strehl ratios are above 0.8 for all AOIs within the target range. The final phase profile, shown in FIG. 3, obtained with the procedure achieves diffraction-limited focusing performance for continuously-varying incident angles up to ±90°. The phase profile design coefficients are summarized in TABLE 1. FIG. 4 shows the angular-dependent phase profiles based on phase shifts of individual meta-atoms for the central 1-mm-diameter region of the meta-surface.

FIGS. 5A-5F illustrate the angular responses of the meta-atoms for different linear polarizations at oblique incidence. FIGS. 5A-5C illustrate the different linear polarizations orientations with respect to an H-shaped meta-atom, with FIG. 5A showing y-z polarization, FIG. 5B showing 45°-rotated between y-z and x-z, and FIG. 5C showing x-z (TM) polarization. The E-field y-component is equal to zero. FIGS. 5D-5F show the meta-atoms' angular responses as a function of angular incidence for each of these polarization states.

FIGS. 6A-6D illustrate a WFOV meta-lens 600 designed to work at a 940 nm wavelength and its performance. The WFOV meta-lens 600 includes a planar sapphire substrate with a thickness of 3.9 mm, a circular aperture 630 with a diameter of 1 mm on one side, and a meta-surface 620 on the other side. The meta-surface 620 includes an array of amorphous silicon posts 622 as meta-atoms and focuses light to a planar focal plane located 2.5 mm from the meta-surface 620.

FIG. 6B shows the simulated Strehl ratio (right axis) and focusing efficiency (left axis) as a function of object half angle for the WFOV meta-lens 600. The Strehl ratios are consistently over 0.8, indicating diffraction-limited focusing across the entire FOV, which is about 180°. FIG. 6C shows the simulated modulation transfer functions (MTFs) for the WFOV meta-lens 600 at different AOIs and different planes of incidence and the MTF for a diffraction-limited lens with the same NA. The MTFs indicate that the WFOV meta-lens 600 has diffraction-limited focal spots at different AOIs.

FIGS. 7A-7C illustrate simulated panoramic imaging with a WFOV meta-lens. FIG. 7A shows the imaging simulation setup, with a source image positioned at an infinite distance away from the meta-lens (not drawn to scale). FIG. 7B shows the monochromatic source image—here, of the Parisian skyline—which covers 180° horizontal FOV. And FIG. 7C shows the simulated panoramic image formed by the ultra-wide FOV meta-lens fully accounting for aberration and diffraction effects. The same meta-optic setup, when used with the image sensor replaced by a micro-display, can be readily employed to project an image to the far-field with an ultra-wide FOV.

WFOV Meta-Lens Fabrication

FIG. 8 shows a WFOV meta-lens fabricated using electron beam lithography on a 2-mm-thick $CaF_2$ planar substrate by a double-resist-layer lift-off method. The meta-atoms in this WFOV meta-lens, shown at upper left, are made of thermally evaporated nanocrystalline PbTe and have a uniform thickness of 650 nm. The frontside aperture was defined by a metallic tin layer using standard UV lithography.

More specifically, the meta-lens in FIG. 8 was fabricated on a circular $CaF_2$ substrate (Edmund Optics) with a diameter of 15 mm and a thickness of 2 mm. Given the symmetry of the meta-surface layout, only a 2 mm×3.6 mm section of the meta-surface was needed and fabricated to validate the WFOV performance. Prior to fabrication, the substrate surface was cleaned in sequential acetone and isopropanol alcohol (IPA) sonication baths for 3 minutes each. Afterwards, the sample was baked at 190° C. for 5 minutes to fully evaporate solvent and adsorbed moisture on its surface.

Then the substrate was treated with oxygen plasma (150 W, 1 minute, pressure 0.8 Torr) to remove organic residue contaminants.

One side of the sample was covered with a double-layer photoresist composed of PMGI (800 nm thick) and ZEP 520A (400 nm thick). The PMGI layer was spin-coated at 2400 revolutions per minute (rpm) for 1 minute, then baked at 190° C. for 3 minutes. The baking step is critical for assuring mechanical stability of the PMGI layer. The ZEP layer was spin-coated at 4000 rpm for 1 minute and baked at 190° C. for 2 minutes. To prevent charging effects while performing electron beam (e-beam) lithography, the sample was covered with a water-soluble conductive polymer (ESpacer 300Z, Showa Denko America, Inc.) and placed a conducting clamp on top of the substrate.

The meta-surface patterns (FIG. 8, right) were written with an e-beam lithography system (Elionix ELS F-125) at a voltage of 125 kV, current 10 µA, and proximity effect correction (PEC) with a base dose of 380 µC/cm². The ZEP layer was developed by submerging the sample into water, ZEDN50, and IPA for 1 minute each. The PMGI layer was subsequently partially dissolved with RD6 developer diluted in a 1:1 ratio with water. This partial dissolution should be done carefully in order to achieve an undercut without collapsing the pattern.

After photoresist development, a 650-nm-thick PbTe film was deposited by thermal evaporation (custom-designed system, PVD Products, Inc.) at a rate of 17 Å/s and a base pressure of $10^{-6}$ Torr. Before deposition, the sample was pre-cleaned with oxygen plasma to improve adhesion of the film. Later, the meta-surface pattern was transferred by lifting off the material on top of the photoresist by overnight soaking in N-Methyl-2-pyrrolidone (NMP).

The other side of the sample was patterned with a circular aperture of 1 mm in diameter. The side patterned with the PbTe meta-surface was protected by a dry film photoresist (DuPont MX5000 series) during the aperture fabrication. To fabricate the aperture, the surface was cleaned with oxygen plasma and spin-coated with a negative photoresist NR1000PY (Futurrex, Inc.) at 1500 rpm for 1 minute. Then the sample was soft baked at 115° C., exposed to UV light through the mask for 40 seconds, and hard-baked at 155° C. The exposed photoresist was subsequently developed in RD6 for 10 seconds and rinsed with water afterwards. Then a 200 nm layer of tin was deposited by thermal evaporation and lifted off by removing the photoresist with acetone. Finally, the dry film photoresist covering the meta-surface side was removed by overnight NMP treatment.

WFOV Meta-Lens Characterization

FIGS. 9A-9I illustrate experimental characterization of the focal spot quality of the WFOV meta-lens 700 in FIG. 7 at various AOIs. FIG. 9A shows the measurement setup 900, with the WFOV meta-lens 700 illuminated from the aperture side by a collimated, linearly polarized laser beam from a 5.2 µm wavelength laser 910. The laser 910 was mounted on a circular rail 912, allowing variation of the AOI from 0° to 85°. The maximum AOI of 85° was limited by geometric constraints of the experimental setup 900 rather than the lens performance. The focal spot image was magnified using a pair of mid-IR lenses 920 with a calibrated magnification of 120±3 and projected onto a liquid-nitrogen-cooled InSb focal plane array (FPA) camera 930.

FIGS. 9B-9G show examples of the focal spot images measured with the FPA camera 930. The inset of FIG. 9H shows cross-sectional optical intensity profiles of the focal spots at 0°, 70°, and 85° incident angles alongside a simulated ideal focal spot profile from an aberration-free lens with the same NA for comparison. FIG. 9H also shows the measured Strehl ratios. For all the incident angles, the Strehl ratio remains above 0.8, indicating diffraction-limited focusing performance from the meta-lens 700.

FIG. 9I is a plot of the focusing efficiency of the meta-lens versus AOI for linearly polarized light. The focusing efficiency is defined as the ratio between the power confined at the focal spot and the power incident on the meta-surface of the meta-lens. The data in FIG. 9I indicate a relatively weak dependence on the AOI, with the focusing efficiency varying from 45% to 32% as the AOI changes from 0° to 85°. This relatively flat angular response is a useful feature in providing nearly uniform illumination across an image formed by the meta-lens.

The power focused by a meta-lens $P_{ms,foc}(\theta_i)$ can be expressed in terms of total incident power $P_0$ transmitted through the frontside aperture (e.g., a 1 mm circular aperture), meta-lens focusing efficiency $f(\theta_i)$, and Fresnel transmittance factor $T_p(\theta_i)$ accounting for reflection losses at the interface between air and the substrate (e.g., $CaF_2$):

$$P_{ms,foc}(\theta_i) = P_0 \cdot T_p(\theta_i) f(\theta_i). \tag{3}$$

The total incident power $P_0$ can be further written as $P_0 = P_0(0) \cdot \cos(\theta_i)$, where $P_0(0)$ is the total incident power through the aperture at normal incidence ($\theta_i = 0°$). The cosine factor comes in because when the same collimated laser beam (with a beam diameter much larger than the aperture size) is incident obliquely on the meta-lens, the power density drops by a factor of cos(θ) due to geometric projection.

In FIGS. 9A-9I, the measurements are of $\eta(\theta_i)$—the ratio of focused to total transmitted power by meta-lens, $P_{ms,trans}(\theta_i)$—power transmitted by meta-lens, and $P_{ref}(\theta_i)$—power transmitted through a reference sample (a $CaF_2$ substrate with identical thickness and a 1 mm aperture but without the backside meta-surface). By these definitions:

$$\eta(\theta_i) = P_{ms,foc}(\theta_i) / P_{ms,trans}(\theta_i) \tag{4}$$

In Eq. (5), the $T_p(\theta_i)$ factor is squared because there are two $CaF_2$-air interfaces with identical transmittance. Finally, the value of focusing efficiency $f(\theta_i)$ is given by:

$$f(\theta_i) = \frac{P_{ms,foc}(\theta_i)}{P_0 \cdot T_P(\theta_i)} = \frac{P_{ms,foc}(\theta_i) T_P^2(\theta_i)}{P_{ref}(\theta_i) T_P(\theta_i)} = \frac{P_{ms,foc}(\theta_i) T_P(\theta_i)}{P_{ref}(\theta_i)}. \tag{6}$$

$P_0$, $P_{ms,trans}(\theta_i)$, and $P_{ref}(\theta_i)$ were measured using a large-area detector to capture all of the transmitted power. $T_p(\theta_i)$ was then calculated from $P_0$ and $P_{ref}(\theta_i)$ according to Eq. (5). $P_{ms,foc}(\theta_i)$, was quantified by measuring the transmitted power $P_{hole}(\theta_i)$ incident upon a detector integrated with a 200 µm diameter pin hole. The FPA camera imaged the focal plane around the focal spot over a 200 µm diameter area. Integrating the optical intensity values from the FPA camera pixel-by-pixel yielded the fraction of power concentrated at the focal spot over the total power transmitted through the pin hole, i.e., $P_{ms,foc}(\theta_i)/P_{hole}(\theta_i)$. $P_{ms,foc}(\theta_i)$ was extracted via $P_{hole}(\theta_i) \times P_{ms,foc}(\theta_i)/P_{hole}(\theta_i)$. (Unfortunately, the FPA camera did not give optical power readings and instead only specifies relative optical intensity in counts.)

Imaging with a WFOV Meta-Lens

FIGS. 10A and 10B illustrate the wide-angle imaging capability of the WFOV meta-lens 700. FIG. 10A shows the measurement setup 1000, where a laser 1010 illuminates an object 1014 through a diffuser 1012. The meta-lens 700 collects the light scattered by the object 1014 and projects it onto an InSb FPA camera 1030 through a mid-IR lens 1020. In the experiment, the distance between the object 1014 and the meta-lens 700 is fixed to 2 mm to be consistent with the planar geometry of the lens focal plane. The mid-IR lens 1020 and camera 1030 are mounted on a semi-circular rail 1032 so that they can be rotated about an axis that runs through the meta-lens 700 and perpendicular to the optical axis of the meta-lens 700. The object 1014 includes metallic tin patterns replicating the USAF resolution test chart. The selected test target pattern (group 5, element 1) contains three stripes, each 15.6 µm wide, close to the ideal diffraction-limited resolution of the lens (13.2 µm).

FIG. 10B shows clearly resolved images of the pattern recorded at the full angular range of the experimental setup 1000 in FIG. 10A. This angular range is from 0° to 82° and is bounded by geometric constraints of the experimental setup 1000. The images in FIG. 10B confirm diffraction-limited imaging performance of the meta-lens over an extremely wide angular range.

Beam/Image Projection

When light emitter arrays are positioned at the focal plane, the WFOV meta-lens system can be used for beam or image projection with a large projection angle. In FIG. 1B, for example, light emitted from each light source (pixel) in the array of light sources 140 (e.g., a micro-LED display) is collimated by the meta-surface 120 on one side of the substrate 110 and directed towards the aperture 130 located on the other side of the substrate 110 and directed or projected towards different directions. The output beams or images are coupled into another medium, such as free-space, or to other optical elements or waveguide structures. The meta-surface's phase profile is engineered such that diffraction-limited focusing or collimation performance can be achieved over a FOV of nearly 180° in air, corresponding to a maximum refraction angle of about e.g., about 42° inside the substrate 110 with a refractive index of 1.5 at the operating wavelength. This is in drastic contrast to existing meta-optical systems, which use multiple meta-surfaces to maintain imaging quality at large incidence angles.

The WFOV meta-lens 100 can be used for projecting an array of beams generated from the emitter array 140 towards a wide range of angles, for applications such as 3D sensing, detection, ranging, communication, etc. The WFOV meta-lens 100 can also be used to project images generated from the emitter array 140 (e.g., a micro-display) towards a wide range of angles, for applications such as display, holography, AR/VR, etc. Some examples are explained below.

3D Sensing with WFOV Meta-Lenses

Existing 3D depth sensors based on structured light (SL), time-of-flight (TOF), or active stereoscopic technologies are constrained by a small FOV (typically less than 70°) and resolution usually limited to around 1,000×1,000 resolvable spots or angles. A different yet related technology is vision-based simultaneous localization and mapping (V-SLAM). Intel's RealSense™ Tracking Camera T265 uses V-SLAM to provide an impressive stitched FOV up to 163°, although it has two fisheye imaging units and suffers from lower resolution due to the inferior imaging quality of the fisheye lenses compared to standard camera optics, especially at large field angles.

FIGS. 11A and 11B illustrate a 3D sensor 1100 with two WFOV meta-lenses 1112 and 1122. This 3D sensor 1100 takes advantage of the ultra-wide FOV, diffraction-limited performance, planar focal plane, and simplicity of the WFOV meta-lenses 1112 and 1122 for 3D sensing applications, such as optical touch interface, gesture control, face recognition, object detection/tracking, 3D scanning, navigation, etc.

The 3D sensor 1100 includes a pattern projecting module 1110 with the first WFOV meta-lens 1112 and a light emitter array 1114 (e.g., a micro-LED or vertical-cavity surface-emitting laser (VCSEL) array) and a camera module 1120 with the second WFOV meta-lens 1122 and photodetector array 1124. (For stereoscopic sensing, the light emitter array 1114 can be replaced by a second photodetector array, turning the patterning projecting module 1110 into another camera module.) The pattern projecting module 1110 and camera module 1120 are mounted on a substrate 1102, which may be a flexible or rigid piece of plastic, glass, or other suitable material. The entire sensor 1100 may be less than 7 mm thick (e.g., 3 mm or thinner) and can be made with commercial light emitter and photodetector arrays.

The pattern projecting module 1110 projects patterns, such as arrays of dots or stripes, into free-space with a large angular range 1111 (e.g., 120°, 130°, 140°, 150°, 160°, 170°, or larger) and onto an object 1101 (e.g., a hand or fingertip). The image of the object 1101 as illuminated by the pattern projector 1110 is captured by the camera module 1120 over an equally wide and overlapping FOV 1121. A processor (not shown) coupled to the pattern projecting module 1110 and the camera module 1120 analyzes the image captured by the camera module 1120 to generate 3D information about the object 1101.

The ultra-wide beam projection and detection angles 1111 and 1121 allow 3D sensing over large spatial and angular ranges. Diffraction-limited performance of the meta-lenses 1112 and 1122 allows high-quality pattern generation and high-resolution imaging. The simple optical module configuration facilitates tight integration into mobile devices, such as smartphones and tablets, and tolerance to assembly misalignment. The fields-of-view for structured light projection and imaging can be close to 180°, with diffraction-limited spatial resolution, to provide precise near-surface 3D sensing/imaging.

For example, a sensor 1100 using the NIR meta-lenses 600 shown in FIG. 6A (operating at 940 nm with an aperture size of 1 mm) can operate with an average angular resolution of 0.1° across the entire 180° FOV owing to diffraction-limited focusing/collimation. The sensor optics can therefore support a resolution of approximately 1,800×1,800, representing a major improvement over state-of-the-art 3D sensors, with further performance improvement possible simply by increasing the aperture size.

The sensor 1100 in FIGS. 11A and 11B can have an ultra-compact, thin profile with a thickness less than 7 mm and is compatible with micro-LED arrays (now available with <3 µm pitch, commensurate with the meta-lens's 2.9 µm diffraction-limited spatial resolution) and imager sensor integration. While this sensor 1100 registers each unit pixel on the source array 1114 to a point in the far-field, the front aperture of the first WFOV meta-lens 1112 can be integrated with another meta-surface (e.g., optional meta-surface 134 in FIG. 1A) engineered to further modify the emitted beam pattern (e.g., phase, amplitude, polarization) as well as wavelength-, polarization-, and/or angular-dependent responses. This other meta-surface can be in or on the clear part aperture or another part of the substrate and can further enhance functionality of the meta-lens 1112 and increase the complexity and information density of the projected pattern over the 180° FOV. The second meta-surface can be configured to filter or to vary the polarization of the light transmitted by the aperture. Alternatively, the second metasurface can be configured to vary the wavelength of the light transmitted by the aperture, for example, by nonlinear effects induced in the meta-surface.

The meta-surface on the aperture side of the meta-lens 1112 can also "contain" the aperture by modulating the distribution of its phase, amplitude, spectral, and/or polarization responses to form an effective aperture. For example, this aperture-side meta-surface can modulate the phase distribution of the incident light so that light within the effective aperture region is transmitted or further modulated to propagate towards the backside meta-surface while the incident light outside the aperture is scattered or deflected away from the region for WFOV imaging or sensing. The meta-surface region outside the effective aperture can also be designed to have minimal transmitted power (e.g., by engineering reflection or absorption properties of the meta-surface). The meta-surface region outside the effective aperture can also be designed to possess spectral or polarization filtering properties to block light with certain wavelengths or polarizations.

Compared to state-of-the-art 3D sensing, 3D sensing with WFOV meta-lenses has many advantages: (1) it is universally applicable to SL, TOF, and active stereoscopic 3D depth sensing; (2) it simultaneously solves the FOV limitations associated with illumination and light receiving (camera) optics; (3) the diffraction-limited imaging and image projection capabilities of the meta-surface optics enable fine spatial resolution over the entire FOV, free of aberrations; (4) since the optics are designed to operate at a single NIR wavelength (e.g., for VCSEL illumination) or over a narrowband (e.g., for micro-LED array illumination), very high (e.g., near-unity) optical efficiency can be achieved; (5) an ultra-compact form factor and minimum element count; and (6) as different parts of the meta-surface interact with light at different AOIs, the meta-atoms can be locally configured to reject ambient light outside the operation wavelength. Unlike traditional optical filters whose passband shifts spectrally with AOI and therefore cannot be used over a large angular range, the meta-surface's unique ultra-wide-angle optical filtering capability can significantly boost signal-to-noise ratio (SNR) and dynamic range.

The high-resolution, panoramic 3D sensor 1100 in FIGS. 11A and 11B has applications spanning consumer electronics, robotics, augmented/merged reality, automotive and unmanned aerial vehicles (UAVs), etc. For instance, the wide sensing FOV enables near-surface hand gesture recognition and control using a single-point sensor, which is not possible with current 3D sensing approaches. In augmented and virtual reality, the fine sensor resolution and large FOV (matching that of human vision) allows rapid and precise reconstruction of the surrounding environment for creating an immersive user experience.

WFOV Meta-Lenses for Augmented Reality (AR) and Virtual Reality (VR)

Micro-displays for augmented and virtual reality applications are attracting significant research and development efforts nowadays due to their broad implementation spaces in next generation display technologies. In terms of optical architectures, AR/VR displays can be categorized into two main groups: bulk-optic-based and waveguide based-systems. Waveguide-based systems are of growing interests in recent years due to their compact form factor and the ease of integration with eyeglasses and other devices. State-of-the-art waveguide-based displays are still limited in resolution and FOV. For example, the FOVs of existing commercial waveguide AR/VR systems are typically less than 45°×45°, far less than the range of human vision. In order to improve the display quality, conventional optical engines use complex and multi-element optical systems, which increase system size and weight.

FIG. 12 shows an AR/VR system 1200 with an optical engine 1210 comprised of a micro-LED array 1212 and a high-resolution, WFOV projection meta-lens 1214. The WFOV projection meta-lens 1214 is coupled to a waveguide 1230 by an optical coupling structure 1220, such as a 3D free-form coupling structure (as in FIG. 12), sub-wavelength optical structure, or diffractive optical element. The waveguide 1222 is also coupled to or includes a waveguide out-coupling structure 1224, such as another 3D free-form coupling structure, sub-wavelength optical structure, or diffractive optical element. The micro-display 1212 emits light beams that are collimated by the WFOV meta-surface projection optic 1214 and subsequently coupled into the waveguide 1230 via the optical coupling structure 1220. The waveguide 1222 directs the light to the waveguide out-coupling structure 1224, where the image is projected out-of-plane directly into the eye(s) 1201 at a large FOV (e.g., close to 180°).

Assuming an aperture size of 2 mm, owing to its aberration free imaging performance, the angular resolution of the WFOV meta-surface projection optic 1214 is 0.34 mRad at a wavelength of 550 nm, very close to the resolution of a human eye (e.g., about 0.3 mRad). Given a 180° FOV, this results in a resolution of over 9000×9000 resolvable spots at each RGB wavelength and an approximately 9 mm×9 mm FOV on the micro-display. The total thickness of the meta-optical system is only a few millimeters.

Meta-Lenses with Meta-Surface Apertures

FIGS. 13A and 13B show meta-lenses 1300 and 1302, respectively, that modulate beams projected by emitters (e.g., LEDs or VCSELs) 1342a-1342c in a light emitter array 1340. In FIG. 13A, the light emitter array 1340 is in the planar focal plane of the meta-lens 1300, which includes a transparent substrate 1310 with a first meta-surface 1320 on one side and a second meta-surface 1334 on the other side. The first meta-surface 1320 collimates the beams emitted by the light emitters 1342, which may span a FOV that is 120° or larger. The collimated beams propagate through the substrate 1310 to the second meta-surface 1334, which spans an area smaller than the area of the first meta-surface 1310. The second meta-surface 1334 modulates the phase, amplitude, polarization, and/or spectral properties of the collimated beams to generate 2-D or 3-D optical patterns, dot arrays/clouds, images, hologram, or patterns with different polarization, and/or spectral properties. The first meta-surface 1320 can also be configured to generate 2D or 3D patterns that vary based on the incidence angle, wavelength, polarization, etc. of the incident beams.

FIG. 13B shows a similar meta-lens 1302. The difference is that the second meta-surface 1336 is configured to generate patterns that vary as a function of the angle of incidence. In this case, light from emitter 1342a produces an array of dots on a square lattice, whereas light from emitters 1342b and 1342c produce different sparse arrays of dots. The second meta-surface 1336 can also be configured to modulate incident beams depending on other beam properties, including spatial, polarization, and/or spectral properties. For instance, the second meta-surface 1336 can also be configured to generate wavelength- or polarization-dependent patterns so that emitted light with different wavelengths or polarization properties from the light emitter array 1340 produces customizable patterns. The incident-beam-property-dependent responses of the first and second meta-surfaces 1320 and 1336 can be utilized in a combined manner. Alternatively, DOEs can be used instead of or in combination with the second meta-surface 1334/1336. The illumination patterns with customizable or reconfigurable spatial, angular, polarization, and/or spectral properties can be coupled with object reconstruction algorithms associated with such modalities to efficiently extract the properties of a scene.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical component comprising:
   a substrate;
   an opaque layer on a first side of the substrate, the opaque layer defining an aperture to refract visible to infrared light; and
   a meta-surface, on a second side of the substrate opposite the first side, to focus the visible to infrared light refracted by the aperture through the substrate to a planar focal plane.

2. The optical component of claim 1, wherein the substrate is planar.

3. The optical component of claim 1, wherein the substrate is curved.

4. The optical component of claim 1, wherein the substrate has a thickness $t_{sub}t_{sub}$ and a refractive index at a wavelength of the visible to infrared light of $n_{sub}n_{sub}$, the aperture has a diameter of $D_{in}D_{in}$, and the meta-surface has a diameter $D_{meta}=D_{in}=2t_{sub}\tan[\sin^{-1}(1/n_{sub})]$.

5. The optical component of claim 1, wherein the aperture has a field of view of at least 170°.

6. The optical component of claim 1, wherein the planar focal plane is parallel to the second side of the substrate and the meta-surface is configured to focus the visible to infrared light incident over all of a field of view to the planar focal plane.

7. The optical component of claim 6, further comprising:
a detector array, in the planar focal plane, to detect the visible to infrared light focused by the meta-surface.

8. The optical component of claim 1, wherein the meta-surface is configured to focus the light incident over all of a field of view of the aperture with a Strehl ratio of at least 80%.

9. An optical component comprising:
a substrate;
an opaque layer on a first side of the substrate, the opaque layer defining an aperture to transmit light;
a meta-surface, on a second side of the substrate opposite the first side, to focus the light transmitted by the aperture through the substrate to a planar focal plane, wherein the planar focal plane is parallel to the second side of the substrate and the meta-surface is configured to focus the light incident over all of a field of view to the planar focal plane; and
a light source array in the planar focal plane,
wherein the meta-surface is configured to collimate a beam emitted by the light source array and the aperture is configured to emit the beam.

10. The optical component of claim 9, wherein the meta-surface and/or the aperture are further configured to modulate the beam emitted by the light source array.

11. The optical component of claim 9, wherein the meta-surface is a first meta-surface, and further comprising:
a second meta-surface, disposed in at least a portion of the aperture, to modulate and/or filter the light transmitted by the aperture.

12. The optical component of claim 9, wherein the substrate has a thickness $t_{sub}$ and a refractive index at a wavelength of the light of $n_{sub}$, the aperture has a diameter of $D_{in}$, and the meta-surface has a diameter $D_{meta}=D_{in}+t_{sub}\tan[\sin^{-1}(1/n_{sub})]$.

13. The optical component of claim 9, wherein the field of view is at least 170°.

14. An optical component comprising:
a substrate;
an opaque layer on a first side of the substrate, the opaque layer defining an aperture to transmit light;
a first meta-surface, disposed in at least a portion of the aperture, to modulate and/or filter the light transmitted by the aperture, wherein the first meta-surface is configured to modulate the light transmitted by the aperture with a spatial modulation pattern that depends on an angle of incidence of the light transmitted by the aperture; and
a second meta-surface, on a second side of the substrate opposite the first side, to focus the light transmitted by the aperture through the substrate to a planar focal plane, wherein the planar focal plane is parallel to the second side of the substrate and the second meta-surface is configured to focus the light incident over all of a field of view to the planar focal plane.

15. The optical component of claim 14, wherein the substrate has a thickness $t_{sub}$ and a refractive index at a wavelength of the light of $n_{sub}$, the aperture has a diameter of $D_{in}$, and the second meta-surface has a diameter of $D_{meta}=D_{in}+t_{sub}\tan[\sin^{-1}(1/n_{sub})]$.

16. The optical component of claim 14, wherein the field of view is at least 170°.

17. A method comprising:
refracting visible to infrared light through an aperture formed on a first side of a substrate; and
focusing the visible to infrared light to a planar focal plane with a meta-surface on a second side of the substrate opposite the first side.

18. The method of claim 17, wherein refracting the visible to infrared light is over a field of view of at least 170°.

19. The method of claim 18, further comprising:
detecting the visible to infrared light focused by the meta-surface with a detector array in the planar focal plane.

20. The method of claim 17, wherein the planar focal plane is parallel to the second side of the substrate and focusing the visible to infrared light comprises focusing the visible to infrared light incident over all of a field of view of the aperture to the planar focal plane.

21. The method of claim 17, wherein focusing the light comprises focusing the light incident over all of a field of view of the aperture with a Strehl ratio of at least 80%.

22. A method comprising:
transmitting light through an aperture formed on a first side of a substrate;
focusing the light to a planar focal plane with a meta-surface on a second side of the substrate opposite the first side, wherein the planar focal plane is parallel to the second side of the substrate and focusing the light comprises focusing the light incident over all of a field of view of the aperture to the planar focal plane;
collimating a beam emitted by a light source in the planar focal plane with the meta-surface; and
emitting the beam through the aperture.

23. A method comprising:
transmitting light through an aperture formed on a first side of a substrate;
focusing the light to a planar focal plane with a meta-surface on a second side of the substrate opposite the first side; and
modulating, based on an angle of incidence of the light transmitted by the aperture, at least of a phase, an amplitude, a polarization, or a wavelength of and/or filtering the light transmitted by the aperture with another meta-surface disposed in at least a portion of the aperture.

24. An optical component comprising:
a substrate;
a first meta-surface on a first side of the substrate to reshape or modulate light incident on the first side of the substrate at different angles; and
a second meta-surface, on a second side of the substrate opposite the first side, to modulate an angle of incidence, a phase, an amplitude, a polarization, and/or a spectral property of the light reshaped, modulated, and/or transmitted by the first meta-surface.

25. The optical component of claim 24, wherein the first meta-surface is configured to modulate the light as a function of a phase, an amplitude, an angle of incidence, a polarization, and/or a spectral property of the light.

26. The optical component of claim 24, where the optical component is immersed in another material.

27. The optical component of claim 24, wherein the first meta-surface is configured to modulate the light incident on the first side of the substrate with a spatial modulation pattern that depends on an angle of incidence of the light.

* * * * *

UNITED STATES PATENT AND TRADEMARK OFFICE
CERTIFICATE OF CORRECTION

PATENT NO. : 12,212,853 B2
APPLICATION NO. : 17/209496
DATED : January 28, 2025
INVENTOR(S) : Hu et al.

Page 1 of 1

It is certified that error appears in the above-identified patent and that said Letters Patent is hereby corrected as shown below:

In the Claims

- In Claim 4, Column 21, Line 2, replace "thickness $t_{sub}\ t_{sub}$" with -- thickness $t_{sub}$ --

- In Claim 4, Column 21, Line 4, replace "light of $n_{sub}n_{sub}$" with -- light of $n_{sub}$ --

- In Claim 4, Column 21, Line 5, replace "diameter of $D_{in}\ D_{in}$" with -- diameter of $D_{in}$ --

Signed and Sealed this
Twenty-fifth Day of February, 2025

Coke Morgan Stewart
*Acting Director of the United States Patent and Trademark Office*